United States Patent
Oikawa

(10) Patent No.: US 8,935,030 B2
(45) Date of Patent: Jan. 13, 2015

(54) VEHICLE CONTROL DEVICE

(75) Inventor: Yoshitaka Oikawa, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/821,652

(22) PCT Filed: Apr. 26, 2011

(86) PCT No.: PCT/JP2011/060173
§ 371 (c)(1),
(2), (4) Date: Mar. 8, 2013

(87) PCT Pub. No.: WO2012/147164
PCT Pub. Date: Nov. 1, 2012

(65) Prior Publication Data
US 2014/0046526 A1    Feb. 13, 2014

(51) Int. Cl.
| | | |
|---|---|---|
| G06F 7/00 | (2006.01) |
| B60W 20/00 | (2006.01) |
| B60K 6/445 | (2007.10) |
| B60W 10/06 | (2006.01) |
| B60W 10/08 | (2006.01) |
| B60W 30/20 | (2006.01) |
| B60L 15/20 | (2006.01) |
| B60W 50/00 | (2006.01) |
| B60W 50/14 | (2012.01) |

(52) U.S. Cl.
CPC ............... *B60W 20/10* (2013.01); *B60K 6/445* (2013.01); *B60W 10/06* (2013.01); *B60W 10/08* (2013.01); *B60W 20/00* (2013.01); *B60W 30/20* (2013.01); *B60L 15/20* (2013.01); *B60W 2050/0008* (2013.01); *B60W 2510/0657* (2013.01); *B60W 2510/083* (2013.01); *B60W 2710/0666* (2013.01); *B60W 2710/083* (2013.01); *B60W 2710/105* (2013.01); *B60L 2240/423* (2013.01); *Y02T 10/6286* (2013.01); *Y02T 10/642* (2013.01); *Y02T 10/6239* (2013.01); *Y10S 903/903* (2013.01); *B60W 2050/146* (2013.01)
USPC ........... 701/22; 701/99; 180/65.1; 180/65.21; 180/65.285; 340/432; 340/433; 903/903

(58) Field of Classification Search
None
See application file for complete search history.

(56) References Cited

U.S. PATENT DOCUMENTS 5,272,635 A * 12/1993 Nakayama ...................... 701/89
5,350,989 A * 9/1994 Wedeen .......................... 318/632

(Continued)

FOREIGN PATENT DOCUMENTS

| JP | 9-112329 | 4/1997 |
| JP | 2006-60936 | 3/2006 |

OTHER PUBLICATIONS

Booklet on "Prius" of the third generation, p. 26 (2011).

*Primary Examiner* — Thomas Tarcza
*Assistant Examiner* — Richard Goldman
(74) *Attorney, Agent, or Firm* — Finnegan, Henderson, Farabow, Garrett & Dunner, LLP

(57) ABSTRACT

A vehicle control device is disclosed which calculates a drive torque requirement Treq as a target running force output value for a vehicle on the basis of the amount of driving operation by a driver; calculates a correction torque ΔTreq for suppressing vehicle sprung body vibration; controls an engine and an electric motor on the basis of a post-correction drive torque requirement Tareq which is derived by correcting the drive torque requirement Treq with the correction torque ΔTreq, and controls the indication of the operation state of the electric motor. The correction torque ΔTreq includes at least a feed-back control amount ΔTfb as a disturbance-based correction amount. The indication of the operation state of the electric motor is conducted on the basis of a target running force output value for display in which the influence of the feed-back control amount ΔTfb is reduced as compared with the value Tareq.

18 Claims, 10 Drawing Sheets

(56) References Cited

U.S. PATENT DOCUMENTS

| | | | |
|---|---|---|---|
| 5,442,268 A * | 8/1995 | Goodarzi et al. | 318/432 |
| 6,098,592 A | 8/2000 | Hess et al. | |
| 7,710,252 B2 * | 5/2010 | Kaya | 340/459 |
| 8,525,467 B2 * | 9/2013 | Gee et al. | 318/632 |
| 2006/0113129 A1 * | 6/2006 | Tabata | 180/65.2 |
| 2008/0042821 A1 * | 2/2008 | Kaya | 340/459 |
| 2009/0096416 A1 * | 4/2009 | Tonegawa et al. | 320/109 |
| 2010/0096922 A1 * | 4/2010 | Kishimoto | 307/9.1 |
| 2012/0016549 A1 * | 1/2012 | Katsumata et al. | 701/22 |
| 2012/0185121 A1 * | 7/2012 | Umehara et al. | 701/22 |
| 2012/0262102 A1 * | 10/2012 | Gee et al. | 318/448 |
| 2013/0184918 A1 * | 7/2013 | Motosugi et al. | 701/22 |
| 2013/0289809 A1 * | 10/2013 | Treharne et al. | 701/22 |
| 2014/0046526 A1 * | 2/2014 | Oikawa | 701/22 |
| 2014/0163792 A1 * | 6/2014 | Kim | 701/22 |

* cited by examiner

VEHICLE CONTROL DEVICE

CROSS-REFERENCE TO RELATED APPLICATIONS

This application is a national phase application of International Application No. PCT/JP2011/060173, filed Apr. 26, 2011, the content of which is incorporated herein by reference.

TECHNICAL FIELD

The present invention relates to a vehicle control device and, more particularly, to a vehicle control device which controls a running force of a vehicle and an indication of running force output state.

BACKGROUND ART

In a vehicle such as an automobile and the like, driving force of a vehicle is controlled in accordance with the driving operation by a driver and the state of the vehicle. For example, as one of the vehicle controls each controlling driving force of a vehicle in accordance with the state of the vehicle, a sprung vibration damping control is already known which presumes the vibration of a vehicle sprung body on the basis of vehicle state and controls driving force of the vehicle so as to suppress the vibration of the vehicle sprung body. An example of the sprung vibration damping control is described in the under-mentioned patent reference 1 wherein a target vehicle driving force based on driving operation by a driver is corrected with a correction amount of the sprung vibration damping control.

CITATION LIST

Patent Literature 1: Japanese Patent Application Laid-open Publication No. 2006-60936

SUMMARY OF INVENTION

Technical Problem

In some vehicles in which at least a part of vehicle driving force is generated by an electric motor, particularly in a hybrid system vehicle and an electric vehicle, the electric motor serves as a regenerator when the vehicle is decelerated by braking and the generated electricity is charged in a battery. In this type of vehicle, is commonly displayed on a display unit installed in a cabin an indication as to whether the operation mode of the electric motor is a drive mode in which it generates driving force by means of the electricity being supplied from the battery or a charging mode in which it supplies electricity to the battery by generation.

In general, the operation mode of the electric motor displayed on the display unit is controlled in accordance with the sign of a target vehicle driving force corrected with a correction amount of sprung vibration damping control. That is, the displayed operation mode is the drive mode when the post-correction target vehicle driving force is positive, while on the other hand, the displayed operation mode is the charging mode when the post-correction target vehicle driving force is negative.

In general, a correction amount of the sprung vibration damping control includes a feed-back control amount based on driving operation by a driver and a feed-forward control amount based on a disturbance from a road surface or the like. The sign of a feed-forward control amount seldom alters repeatedly in a positive and negative but the sign of a feed-back control amount alters repeatedly in a positive and negative with a small altering amplitude.

For that reason, if the sign of a feed-back control amount alters repeatedly in a positive and negative, in particular, under a situation where a feed-forward control amount is small in magnitude, the sign of a correction amount of the sprung vibration damping control alters as well repeatedly in a positive and negative. Therefore, under such a situation, as the post-correction target vehicle driving force also alters repeatedly in a positive and negative, the operation mode of the electric motor displayed on the display unit changes between the drive and charging modes repeatedly, which causes vehicle occupants to feel annoyance.

A primary object of the present invention is, in a vehicle in which a target running force output value for the vehicle is calculated; the target running force output value is corrected with a running force output correction amount for suppressing vibration of the vehicle; and a running force output device of the vehicle is controlled and the running force output state by the running force output device is displayed on the basis of the post-correction target running force output value, to suppress repeated changes in the indication of the driving force output state due to the repeated changes in the sign of the post-correction target vehicle driving force.

Solution to Problem and Advantageous Effects

The present invention provides a vehicle control device comprising: a target running force output value calculation unit which calculates a target running force output value for a vehicle on the basis of the amount of driving operation by a driver; a running force output correction amount calculation unit which calculates a target running force output correction amount for suppressing vibration of the vehicle; a control unit which controls a running force output device of the vehicle on the basis of a post-correction target running force output value which is derived by correcting the target running force output value with the running force output correction amount; a display unit which displays a running force output state of the running force output device; wherein the running force output correction amount includes at least a disturbance-based correction amount which is calculated on the basis of at least a disturbance on the vehicle; and the display unit displays a running force output state on the basis of a target running force output value for display in which the influence of the disturbance-based correction amount is reduced as compared with the post-correction target running force output value.

According to the configuration, the running force output state is displayed on the basis of a target running force output value for display in which the influence of the disturbance-based correction amount is reduced as compared with the post-correction target running force output value. Accordingly, the influence of the disturbance-based correction amount on the indication of the running force output state can be reduced as compared with the case where the running force output state is displayed on the basis of the post-correction target running force output value, i.e. the value which is derived by correcting the target running force output value with the running force output correction amount. Therefore, even in the situation where the sign of the disturbance-based correction amount changes repeatedly in a plus and minus due to a disturbance on the vehicle, the possibility that the sign of the target running force output value for display changes repeatedly in a plus and minus can be reduced, which enables to suppress the indication of the running force output state of the running force output device from changing repeatedly due to repeated changes in the sign of the target running force output value for display and to thereby suppress vehicle occupants from feeling annoyance.

The above-mentioned configuration may be such that: the target running force output value for display is a value which is derived by correcting the target running force output value with the running force output correction amount when the target running force output is larger in magnitude than a reference value, and is a value in which the influence of the disturbance-based correction amount is reduced as compared with the post-correction target running force output value when the target running force output is not larger in magnitude than the reference value.

According to the configuration, when the target running force output is not larger in magnitude than the reference value and is susceptible to change repeatedly in a plus and minus, the target running force output value for display is a value in which the influence of the disturbance-based correction amount is reduced than the post-correction target running force output value. Accordingly, the indication of the running force output state of the running force output device can be more effectively suppressed from changing repeatedly as compared with the case where the running force output state for display is a value which is derived by correcting the target running force output value with the running force output correction amount even when the target running force output is not larger in magnitude than the reference value.

When the target running force output is larger in magnitude than the reference value, the target running force output value for display is a value which is derived by correcting the target running force output value with the running force output correction amount, i.e. the post-correction target running force output value. Accordingly, the indication of the running force output state can be more accurately displayed in accordance with an actual running force output state as compared with the case where the running force output state for display is a value in which the influence of the disturbance-based correction amount is reduced as compared with the post-correction target running force output value even when the target running force output is larger in magnitude than the reference value.

The above-mentioned configuration may be such that: the value in which the influence of the disturbance-based correction amount is reduced as compared with the post-correction target running force output value is a value in which the influence of the disturbance-based correction amount is reduced to zero by correcting the target running force output value with a correction amount not involving the disturbance-based correction amount.

According to the configuration, the running force output state for display is a value in which the influence of the disturbance-based correction amount is reduced to zero, i.e. a value which is not affected by the disturbance-based correction amount. Accordingly, the indication of the running force output state of the running force output device can be prevented from changing repeatedly due to repeated changes in the sign of the disturbance-based correction amount.

The above-mentioned configuration may be such that: the value in which the influence of the disturbance-based correction amount is reduced as compared with the post-correction target running force output value is a value which is derived by correcting the target running force output value with the running force output correction amount modified so as to reduce the disturbance-based correction amount in magnitude.

According to the configuration, the running force output state for display is a value which is derived by correcting the target running force output value with the running force output correction amount modified so as to reduce the disturbance-based correction amount in magnitude, and the influence of the disturbance-based correction amount on the running force output state for display is reduced. Accordingly, the possibility can be reduced that the indication of the running force output state of the running force output device changes repeatedly due to repeated changes in the sign of the disturbance-based correction amount.

The above-mentioned configuration may be such that: the value in which the influence of the disturbance-based correction amount is reduced as compared with the post-correction target running force output value is a value which is derived by filtering the post-correction target running force output value with a particular pass-band frequency range including at least a vehicle resonant frequency range to determine a modification amount and subtracting the modification amount from the post-correction target running force output value.

According to the configuration, the running force output state for display is a value which is derived by subtracting the modification amount from the post-correction target running force output value. In other words, the running force output state for display is a value which is derived by removing components in a particular pass-band frequency range including at least a vehicle resonant frequency range from the post-correction target running force output value. Accordingly, even when the vehicle vibrates at a frequency in the vehicle resonant frequency range, the possibility can be reduced that the sign of the running force output state for display changes repeatedly in a plus and minus, which enables to reduce the possibility that the indication of the running force output state of the running force output device changes repeatedly.

The above-mentioned configuration may be such that: the value in which the influence of the disturbance-based correction amount is reduced as compared with the post-correction target running force output value is a value which is derived by sampling the post-correction target running force output value at a sampling interval other than intervals corresponding to a vehicle resonant frequency range.

According to the configuration, the running force output state for display is a value which is derived by sampling the post-correction target running force output value at a sampling interval other than intervals corresponding to a vehicle resonant frequency range. In other words, the running force output state for display is a value which is modified so as to remove the influence of the disturbance-based correction amount for a vehicle resonant frequency range. Accordingly, even when the vehicle vibrates at a frequency in the vehicle resonant frequency range, the possibility can be reduced that the sign of the running force output state for display changes repeatedly in a plus and minus, which enables to reduce the possibility that the indication of the running force output state of the running force output device changes repeatedly.

The above-mentioned configuration may be such that: the reference value is variably set in accordance with the disturbance-based correction amount.

According to the configuration, the reference value is variably set in accordance with the disturbance-based correction amount. Accordingly, the reference value can be varied in accordance with the influence of the disturbance-based correction amount on the post-correction target running force output value.

The above-mentioned configuration may be such that: the disturbance-based correction amount is calculated as a feed-back control amount on the basis of a disturbance on the vehicle, and the running force output correction amount includes the disturbance-based correction amount and a feed-forward control amount calculated on the basis of the amount of driving operation by the driver.

According to the configuration, the running force output correction amount for suppressing vehicle vibrations can be calculated on the basis of the amount of driving operation by the driver and a disturbance on the vehicle. Accordingly, vehicle vibrations can be suppressed on the basis of the amount of driving operation by a driver and a disturbance on the vehicle.

The above-mentioned configuration may be such that: the target running force output value is a target vehicle driving force; with the vehicle driving direction being deemed to be a positive direction, the disturbance-based correction amount varies repeatedly in a plus and minus; and the display unit alters the indication of the running force output state in accordance with the sign of the target running force output value for display.

According to the configuration, even when the sign of a target driving force of the post-correction target running force output value changes repeatedly in a plus and minus due to the fact that the sign of the disturbance-based correction amount changes repeatedly in a plus and minus, the indication of the running force output state can be suppressed from changing repeatedly.

The above-mentioned configuration may be such that: the running force output device has an electric motor generator and an electric storage device, and when the post-correction target running force output value is a positive value, the electric motor generator generates driving force for driving vehicle wheels by means of an electric energy supplied from the electric storage device, while on the other hand, when the post-correction target running force output value is a negative value, the electric motor generator generates electricity by means of driving forces supplied from the vehicle wheels and charges the electric storage device.

According to the configuration, even when the mode of the electric motor generator changes between the mode where it generates driving force and the mode where it charges the electric storage device, the indication of the running force output state of the running force output device can be suppressed from changing repeatedly between the two modes.

The above-mentioned configuration may be such that: the display unit displays the indication as to whether the electric motor generator is generating driving force or electricity in accordance with the sign of the disturbance-based correction amount in a specific situation where the disturbance-based correction amount and the target running force output value for display are different from each other in sign and the disturbance-based correction amount is larger in magnitude than the target running force output value for display, while on the other hand, the display unit displays the indication as to whether the electric motor generator is generating driving force or electricity in accordance with the sign of the target running force output value for display in situations other than the specific situation.

In the above-mentioned specific situation, whether the electric motor generator is generating driving force or electricity is determined by the sign of the disturbance-based correction amount. However, when the target running force output value for display is a value in which the influence of the disturbance-based correction amount is reduced as compared with the post-correction target running force output value, whether the electric motor generator is generating driving force or electricity is determined by the sign of the target running force output value for display. Therefore, it may happen that the indication as to whether the electric motor generator is generating driving force or electricity is different from the actual operational state of the electric motor generator.

In particular, in the case where the display unit also displays the charge level of the electric storage device, if the indication is displayed that electricity is being generated in spite of the fact that the electric motor generator is generating driving force, the displayed charge level decreases in contradiction to the indication that electricity is being generated. Conversely, if the indication is displayed that driving force is being generated in spite of the fact that the electric motor generator is generating electricity, the displayed charge level increases in contradiction to the indication that driving force is being generated. In either case, the vehicle occupants feel something is wrong.

According to the configuration, in the above-mentioned specific situation, the indication as to whether the electric motor generator is generating driving force or electricity is displayed in accordance with the sign of the disturbance-based correction amount. Accordingly, the indication as to whether the electric motor generator is generating driving force or electricity can be prevented form being different from the actual operational state of the electric motor generator. In situations other than above-mentioned specific situation, the indication as to whether the electric motor generator is generating driving force or electricity is displayed in accordance with the sign of the target running force output value for display. Accordingly, the indication of the operational state of the electric motor generator can be suppressed from changing repeatedly between the driving force generating and electricity generating modes due to repeated changes in a plus and minus in the sign of the disturbance-based correction amount.

The above-mentioned configuration may be such that: the display unit displays the indication as to whether the electric motor generator is generating driving force or electricity in accordance with whether or not the target running force output value for display is larger in magnitude than a state-decision reference value which is derived by subtracting the disturbance-based correction amount from the target running force output value for display in a specific situation where the disturbance-based correction amount and the target running force output value for display are different from each other in sign and the disturbance-based correction amount is larger in magnitude than the target running force output value for display, while on the other hand, the display unit displays the indication as to whether the electric motor generator is generating driving force or electricity in accordance with the sign of the target running force output value for display in situations other than the specific situation.

According to the configuration, in the above-mentioned specific situation, the indication as to whether the electric motor generator is generating driving force or electricity is displayed in accordance with whether or not the target running force output value for display is larger in magnitude than a state-decision reference value. The determination as to whether or not the target running force output value for display is larger in magnitude than the state-decision reference value is equivalent to the determination of the sign of the disturbance-based correction amount. Accordingly, the indication as to whether the electric motor generator is generating driving force or electricity can be prevented form being different from the actual operational state of the electric motor generator. In situations other than above-mentioned specific situation, the indication as to whether the electric motor generator is displayed in accordance with the sign of the target running force output value for display. Accordingly, the indication of the operational state of the electric motor generator can be suppressed from changing repeatedly between the driving force generating and electricity generating modes due to repeated changes in a plus and minus in the sign of the disturbance-based correction amount.

The present invention also provides a vehicle control device comprising: a target running force output value calculation unit which calculates a target running force output value for a vehicle on the basis of the amount of driving operation by a driver; a running force output correction amount calculation unit which calculates a target running force output correction amount for suppressing vibration of the vehicle; a control unit which controls a running force output device of the vehicle on the basis of a post-correction target running force output value which is derived by correcting the target running force output value with the running force output correction amount; a display unit which displays a running force output state of the running force output device; wherein the running force output correction amount includes at least a disturbance-based correction amount which is calculated on the basis of at least a disturbance on the vehicle; when the target running force output is not larger in magnitude than a reference value, the control unit calculates the post-correction target running force output value so that the influence of the disturbance-based correction amount is reduced; and the display unit displays a running force output state on the basis of the post-correction target running force output value.

According to the configuration, when the target running force output is not larger in magnitude than the reference value and is susceptible to change repeatedly in a plus and minus, the post-correction target running force output value is a value which is calculated so that the influence of the disturbance-based correction amount is reduced. Accordingly, the running force output state of the running force output device and the indication thereof can be more effectively suppressed from changing repeatedly as compared with the case where the post-correction target running force output value is a value which is derived by correcting the target running force output value with the running force output correction amount even when the target running force output is not larger in magnitude than the reference value.

When the target running force output is larger in magnitude than the reference value, the post-correction target running force output value is a value which is derived by correcting the target running force output value with the running force output correction amount. Accordingly, the vehicle vibrations can be more effectively suppressed than the case where the post-correction target running force output value is a value in which the influence of the disturbance-based correction amount is reduced as compared with the target running force output value even when the target running force output is larger in magnitude than the reference value. Also, the indication of the running force output state can be more accurately displayed in accordance with an actual running force output state The above-mentioned configuration may be such that: when the target running force output value is not larger in magnitude than the reference value, the control unit calculates the post-correction target running force output value by correcting the target running force output value with a correction amount not involving the disturbance-based correction amount.

According to the configuration, when the target running force output value is not larger in magnitude than the reference value, the post-correction target running force output value is a value in which the influence of the disturbance-based correction amount is reduced to zero, i.e. a value which is not affected by the disturbance-based correction amount. Accordingly, in a situation where the target running force output is susceptible to change repeatedly in a plus and minus, the indication of the running force output state of the running force output device can be prevented from changing repeatedly due to repeated changes in the sign of the disturbance-based correction amount.

The above-mentioned configuration may be such that: when the target running force output value is not larger in magnitude than the reference value, the control unit calculates the post-correction target running force output value by correcting the target running force output value with the running force output correction amount which is modified so as to reduce the disturbance-based correction amount in magnitude.

According to the configuration, when the target running force output value is not larger in magnitude than the reference value, the post-correction target running force output value is a value which is derived by correcting the target running force output value with the running force output correction amount that is modified so as to reduce the disturbance-based correction amount in magnitude. Accordingly, since the influence of the disturbance-based correction amount on the post-correction target running force output value is low, the possibility can be reduced that the indication of the running force output state of the running force output device changes repeatedly due to repeated changes in the sign of the disturbance-based correction amount.

The above-mentioned configuration may be such that: when the target running force output value is not larger in magnitude than the reference value, with a value derived by correcting the target running force output value with the running force output correction amount being referred to a provisional post-correction target running force output value and a value derived by filtering the provisional post-correction target running force output value with a particular pass-band frequency range including at least a vehicle resonant frequency range being referred to a modification amount, the control unit calculates the post-correction target running force output value by subtracting the modification amount from the provisional post-correction target running force output value.

According to the configuration, when the target running force output value is not larger in magnitude than the reference value, the post-correction target running force output value is a value which is derived by subtracting the modification amount from the provisional post-correction target running force output value. In other words, the post-correction target running force output value is a value which is derived by removing components in a particular pass-band frequency range including at least a vehicle resonant frequency range from the provisional post-correction target running force output value. Accordingly, even when the vehicle vibrates at a frequency in the vehicle resonant frequency range, the possibility can be reduced that the sign of the post-correction target running force output value which is the basis of the displayed indication of the running force output state changes repeatedly in a plus and minus, which enables to reduce the possibility that the indication of the running force output state of the running force output device changes repeatedly.

The above-mentioned configuration may be such that: when the target running force output value is not larger in magnitude than the reference value, with a value derived by correcting the target running force output value with the running force output correction amount being referred to a provisional post-correction target running force output value, the control unit calculates the post-correction target running force output value by sampling the provisional post-correction target running force output value at a sampling interval other than intervals corresponding to a vehicle resonant frequency range.

According to the configuration, when the target running force output value is not larger in magnitude than the reference value, the post-correction target running force output value is a value which is derived by sampling the provisional post-correction target running force output value at a sampling interval other than intervals corresponding to a vehicle resonant frequency range. In other words, the post-correction target running force output value is a value which is modified so as to remove the influence of the disturbance-based correction amount for a vehicle resonant frequency range. Accordingly, even when the vehicle vibrates at a frequency in the vehicle resonant frequency range, the possibility can be reduced that the sign of the post-correction target running force output value changes repeatedly in a plus and minus, which enables to reduce the possibility that the indication of the running force output state of the running force output device changes repeatedly.

The above-mentioned configuration may be such that: the control unit variably sets the reference value in accordance with the disturbance-based correction amount.

According to the configuration, as the reference value is variably set in accordance with the disturbance-based correction amount, it can be varied in accordance with the influence which the disturbance-based correction amount has on the post-correction target running force output value. Accordingly, the post-correction target running force output value which is the basis of the indication can be varied in accordance with the influence which the disturbance-based correction amount has on the post-correction target running force output value.

The above-mentioned configuration may be such that: the control unit calculates as the post-correction target running force output value a value which includes the disturbance-based correction amount calculated as a feed-back control value on the basis of a disturbance on the vehicle and a feed-forward control amount calculated on the basis of the amount of driving operation by the driver.

According to the configuration, the running force output correction amount for suppressing vehicle vibrations can be calculated on the basis of the amount of driving operation by the driver and a disturbance on the vehicle. Accordingly, vehicle vibrations can be suppressed on the basis of the amount of driving operation by the driver and a disturbance on the vehicle.

The above-mentioned configuration may be such that: the target running force output value is a target vehicle driving force; with the vehicle driving direction being deemed to be a positive direction, the disturbance-based correction amount varies repeatedly in a plus and minus; and the display unit alters the indication of the running force output state in accordance with the sign of the post-correction target running force output value.

According to the configuration, even when the sign of a target driving force of the post-correction target running force output value changes repeatedly in a plus and minus due to the fact that the sign of the disturbance-based correction amount changes repeatedly in a plus and minus, the indication of the running force output state can be suppressed from changing repeatedly.

The above-mentioned configuration may be such that: the running force output device has an electric motor generator and an electric storage device, and when the post-correction target running force output value is a positive value, the electric motor generator generates driving force for driving vehicle wheels by means of an electric energy supplied from the electric storage device, while on the other hand, when the post-correction target running force output value is a negative value, the electric motor generator generates electricity by means of driving forces supplied from the vehicle wheels and charges the electric storage device.

According to the configuration, even when the mode of the electric motor generator changes between the mode where it generates driving force and the mode where it charges the electric storage device, the indication of the running force output state of the running force output device can be suppressed from changing repeatedly between the two modes.

The above-mentioned configuration may be such that: a running force output correction amount for suppressing vibration of the vehicle is a running force output correction amount for suppressing a sprung body resonant vibration caused by acceleration and deceleration of the vehicle.

The above-mentioned configuration may be such that: the reference value for the magnitude of the target running force output is variably set in accordance with the magnitude of the disturbance-based correction amount so that when the magnitude of the disturbance-based correction amount is large, it assumes a large value as compared with the case where the magnitude of the disturbance-based correction amount is small.

The above-mentioned configuration may be such that: when the post-correction target running force output value is a positive value, the electric motor generator generates driving force for driving vehicle wheels by means of an electric energy supplied from the electric storage device, and the display unit displays the indication that the electric motor generator is generating driving force, while on the other hand, when the post-correction target running force output value is a negative value, the electric motor generator generates electricity by means of driving forces supplied from the vehicle wheels and charges the electric storage device and the display unit displays the indication that the electric motor generator is generating electricity.

DESCRIPTION OF EMBODIMENTS

Some preferred embodiments of the present invention will be described in detail with reference to the accompanying drawings.

First Embodiment

Figure 1:
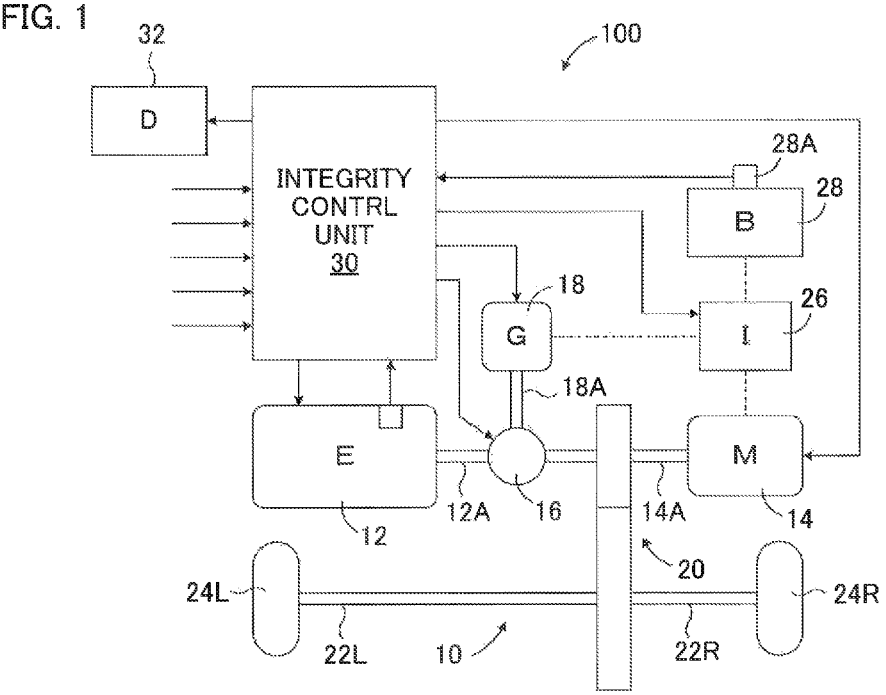
FIG. 1 is a schematic configurational view showing a hybrid system vehicle to which a vehicle control device according to the present invention may be applied.

FIG. 1 is a schematic configurational view showing a hybrid system vehicle to which a vehicle control device according to the present invention may be applied.

Referring to FIG. 1, 100 denotes a vehicle control device and 10 denotes a hybrid system. The hybrid system 10 has an engine 12 such as a gasoline engine and an electric motor 14 as an supplementary power source. An output rotation shaft 12A of the engine 12 and a rotation shaft 14A of the electric motor 14 are mechanically coupled to a power distribution device 16 and a rotation shaft 18A of a generator 18 is also coupled to the power distribution device 16. The power distribution device 16 includes a planetary gear mechanism and changeably assumes either of a mode for transmitting the power of the engine 12 to the rotation shaft 14A, a mode for transmitting the power to the rotation shaft 18A, and a mode for transmitting the power to the rotation shafts 14A and 18A.

The electric motor 14 is drivingly connected to the inner ends of left and right drive shafts 22L and 22R by way of a reduction gear device 20 installed with a planetary gear mechanism. The outer ends of the drive shafts 22L and 22R are coupled to left and right drive wheels 24L and 24R by way of constant velocity universal joints not shown in FIG. 1. When the vehicle is under driving running condition, the power of the rotation shaft 14A is transmitted as driving running power to the drive wheels 24L and 24R by way of the reduction gear device 20 and the drive shafts 22L and 22R. When the vehicle is under deceleration braking condition, the rotation power which each of the drive wheels 24L and 24R receives from a road surface is transmitted to the rotation shaft 14A by way of the drive shafts 22L, 22R and the reduction gear device 20 and is in turn transmitted to the electric motor 14. Under this situation, the power distribution device 16 shuts down the connection between the rotation shaft 14A and the rotation shafts 12A and 18A.

The electric motor 14 and the generator 18 are of AC type and are connected with a battery 28 by way of an inverter 26. The electric motor 14 is supplied with a drive current which is output from the battery 28 and is transformed into AC by the inverter 26 so that the motor generates a power as required. The electric motor 14 functions as a regenerator when the vehicle is under deceleration braking condition, and the regenerated electric current is, after being transformed into DC by the inverter 26, supplied to the battery 28 to charge it. The generator 18 generates electricity by means of a power supplied from the engine 12 by way of the power distribution device 16, and the generated electric current is supplied to the battery 28 to charge it. The electric current generated by the generator 18 is supplied as necessary to the electric motor 14 by way of the inverter 26 so as to drive the electric motor.

The engine 12, the electric motor 14, the power distribution device 16, the generator 18 and the inverter 26 are controlled by a hybrid control section of an integrity control unit 30. The hybrid control section attains the under-mentioned vehicle running modes in accordance with the running condition of the vehicle. The hybrid control section receives an output correction command as necessary from a sprung vibration damping control section in the integrity control unit 30, and controls a driving force of the hybrid system 10 so as to suppress sprung vibrations such as bouncing and pitching of a sprung body.

The vehicle control device 100 includes display unit 32 installed in a cabin. The display unit 32 is controlled by a display control section in the integrity control unit 30, and displays the information about the running of the vehicle. It is to be noted that each control section in the integrity control unit 30 may be a micro-computer of a common configuration having a CPU, a ROM, a RAM, input/output ports, etc. which are connected with one another by bi-directional common bus.

Figure 2:
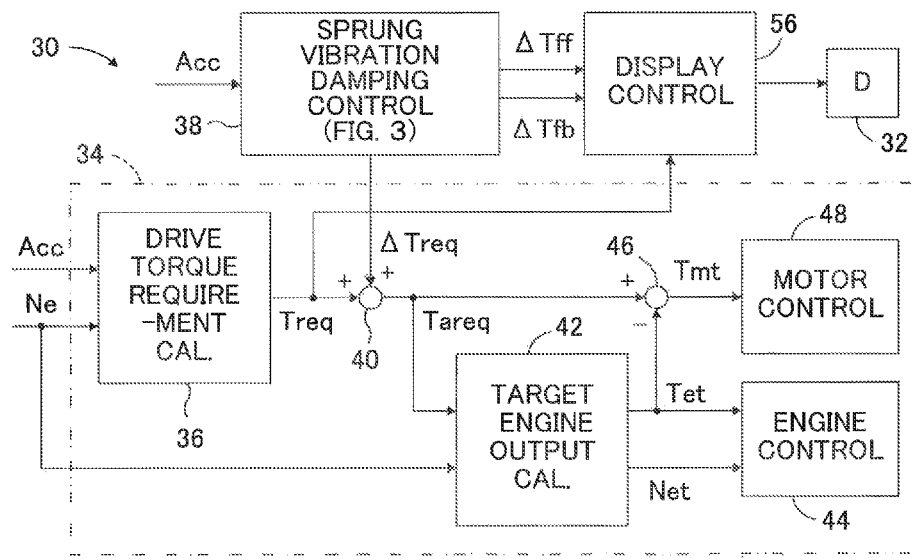
FIG. 2 is a functional block diagram showing the hybrid control section of an integrity control unit 30 together with the sprung vibration damping control section and the display control section.
Figure 3:
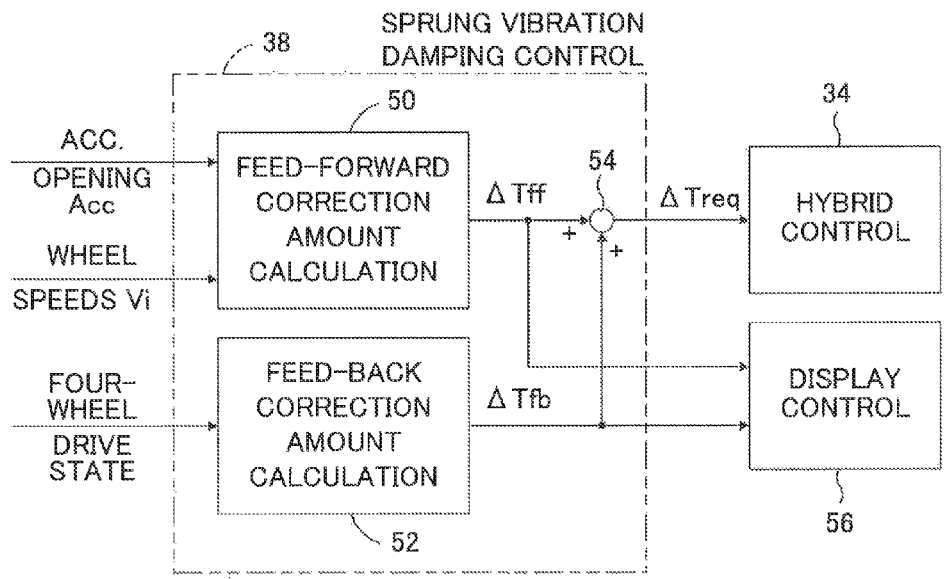
FIG. 3 is a functional block diagram showing the sprung vibration damping control section shown in FIG. 2.

FIG. 2 is a functional block diagram showing the hybrid control section of an integrity control unit 30 together with the sprung vibration damping control section and the display control section. FIG. 3 is a functional block diagram showing the sprung vibration damping control section shown in FIG. 2.

Referring to FIG. 2, the hybrid control section 34 of the integrity control unit 30 has a drive torque requirement calculation block 36, which calculates a drive torque requirement Treq of a driver on the basis of an accelerator opening Acc that is a drive operation amount by the driver and an engine speed Ne. A sprung vibration damping control section 38 calculates a drive torque correction amount ΔTreq for suppressing sprung vibrations. The drive torque requirement Treq and the correction amount ΔTreq are added by an adder 40 to calculate a post-correction drive torque requirement Tareq.

The hybrid control section 34 of the integrity control unit 30 has a target engine output calculation block 42, which calculates a target engine torque Tet and a target engine speed Net on the basis of the post-correction drive torque requirement Tareq and the engine speed Ne. Signals indicative of the target engine torque Tet and the target engine speed Net are output to an engine control block 44, which controls the engine 12 based on the target engine torque Tet and the target engine speed Net.

A signal indicative of the post-correction drive torque requirement Tareq is input to a positive terminal of an adder 46 and a signal indicative of the target engine torque Tet is input to a negative terminal of the adder 46, which calculates a target motor torque Tmt (=Tareq−Tet). A signal indicative of the target motor torque Tmt is input to a motor control block 48, which controls the electric motor 14 based on the target motor torque Tmt.

The vehicle running modes attained by the hybrid control section 34 of the integrity control unit 30 are as follows:

(A) Start and Low Speed Running Mode

When the vehicle is under start and low speed running conditions, the efficiency of the engine is lower than that when the vehicle is under the other conditions. Accordingly, the electric motor 14 is actuated by a drive current supplied from the battery 28 via the inverter 26 with the engine 12 being stopped or ticking over, and the vehicle runs as an electric vehicle. Notably, when the engine 12 is cold, it is idled away until its temperature is elevated to a certain level, but its power is not transmitted out of the system.

(B) Normal Running Mode

When the vehicle is under a normal running condition, the power of the engine 12 is distributed to the generator 18 and the reduction gear device 20 by the power distribution device 16. The electric motor 14 is actuated by the electricity generated by the generator 18. The drive wheels 24L and 24R are driven by both the power supplied from the power distribution device 16 to the reduction gear device 20 and the power generated by the electric motor 14 and supplied to the reduction gear device 20.

(C) High-load Running Mode

When the vehicle is under a high-load running condition in such cases as full-throttle accelerating and steep slope climbing, similarly to the normal running mode, the power of the engine 12 is distributed to the generator 18 and the reduction gear device 20 by the power distribution device 16. But the electric motor 14 is actuated by both the electricity generated by the generator 18 and a drive current supplied from the battery 28 via the inverter 26. Accordingly, the drive wheels 24L and 24R are driven by higher driving forces.

(D) Deceleration Braking Mode

When the vehicle is under a deceleration braking condition, as described above, the rotation power which each of the drive wheels 24L and 24R receives from a road surface is transmitted to the electric motor 14 by way of the drive shafts 22L and 22R, the reduction gear device 20 and the rotation shaft 14A. The electricity generated by the electric motor 14 functioning as a regenerator is supplied to the battery 28 by way of the inverter 26 to charge the battery.

(E) Battery Charging Mode

The battery 28 is controlled to maintain a constant charge level at all times. Accordingly, when a SOC meter 28A detects that the charge level of the battery 28 falls to a value equal to or lower than a preset level, under the above-described normal running mode, the output of the engine 12 is increased and the power distributed to the generator 18 by the power distribution device 16 is increased. The electricity generated by the generator 18 with the increased power is supplied to the battery 28 by way of the inverter 26 to charge the battery.

(F) Eco Run Mode

When the vehicle speed decreases to a value equal to or lower than a preset speed level by deceleration braking and the vehicle stops in such a case as waiting for a traffic light, if the temperature of the engine 12 is equal to or higher than a certain temperature, the engine 12 is automatically stopped so as to prevent fuel from being uselessly consumed by the engine 12 even though an ignition switch is on.

As illustrated in FIG. 3, the sprung vibration damping control section 38 has a feed-forward correction amount calculation block 50, a feed-back correction amount calculation block 52 and an adder 54. The feed-forward correction amount calculation block 50 calculates a feed-forward correction amount ΔTff for suppressing the sprung body vibrations on the basis of at least accelerator opening Acc. The feed-back correction amount calculation block 52 calculates a feed-back correction amount ΔTfb for suppressing the sprung vibrations on the basis of at least a disturbance from a road surface. The adder 54 adds the feed-forward correction amount ΔTff and the feed-back correction amount ΔTfb to calculate a drive torque correction amount ΔTreq.

Signals indicative of the feed-forward correction amount ΔTff and the feed-back correction amount ΔTfb are also input to a display control section 56. It is to be noted that in some embodiments, only a signal indicative of the feed-forward correction amount ΔTff is input to a display control section 56 and a signal indicative of the drive torque correction amount ΔTreq is as well input to the display control section 56.

As described in detail hereinafter, the display control section 56 calculates a drive torque Tdsp for display on the basis of the drive torque requirement Treq, the feed-forward correction amount ΔTff and the like. The display control section 56 controls the indication on the display unit 32 based on at least the drive torque Tdsp for display.

Figure 4:
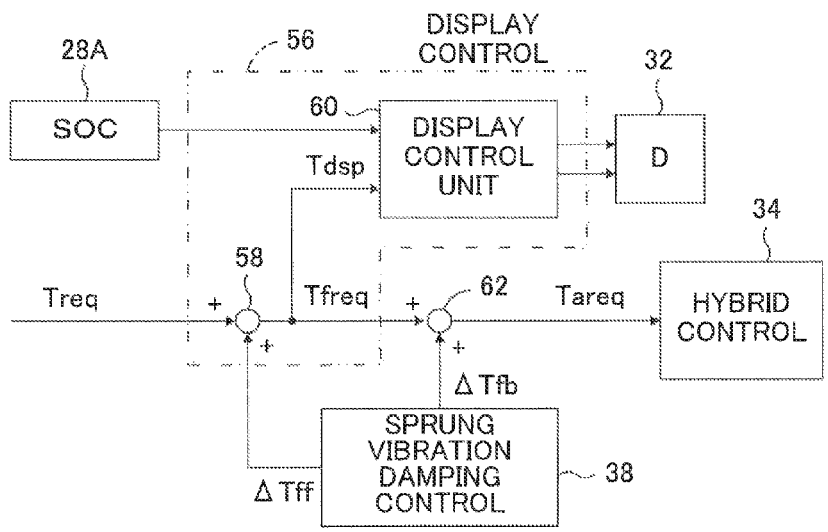
FIG. 4 is a functional block diagram showing the display control section together with the sprung vibration damping control section in the first embodiment of the present invention.

FIG. 4 is a functional block diagram showing the display control section together with the sprung vibration damping control section in the first embodiment of the present invention.

Referring to FIG. 4, the display control section 56 has an adder 58. The display control section 56 is supplied with a signal indicative of the drive torque requirement Treq from the drive torque requirement calculation block 36 in the hybrid control section 34 and is supplied with a signal indicative of the feed-forward correction amount $\Delta$Tff from the sprung vibration damping control section 38. The adder 58 calculates the total Treq+$\Delta$Tff of the drive torque requirement Treq and the feed-forward correction amount $\Delta$Tff as a drive torque requirement Tfreq corrected with the feed-forward correction amount $\Delta$Tff. A signal indicative of the corrected drive torque requirement Tfreq is input to an adder 62 that constitutes a part of the hybrid control section 34 and is input to a display control unit 60 as a drive torque Tdsp for display.

When the drive torque Tdsp for display is a positive value, the display control unit 60 displays on the display unit 30 the indication that the operation mode of the hybrid system 10 is the drive mode. In contrast, when the drive torque Tdsp for display is a negative value, the display control unit 60 displays on the display unit 30 the indication that the operation mode of the hybrid system 10 is the charging mode. The display control unit 60 further displays on the display unit 30 the charge level of the battery 28 on the basis of the charge condition of the battery 28 detected by the SOC meter 28A.

Figure 8:
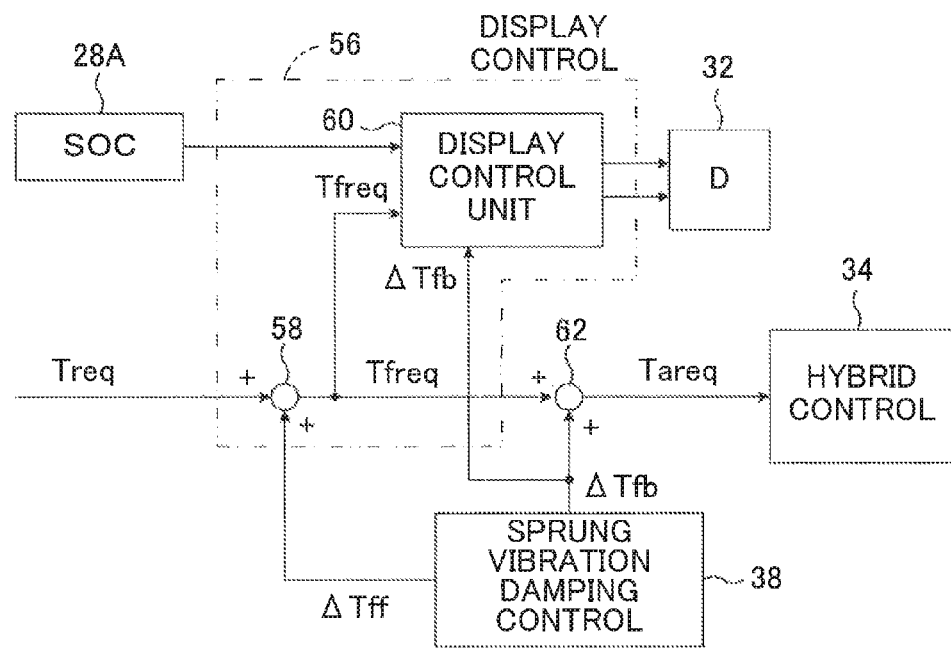
FIG. 8 is a functional block diagram showing the display control section together with the sprung vibration damping control section in the fifth embodiment of the present invention which is configured as a modification of the first embodiment.

It is to be understood that the functions of the display control unit 60 is the same in the other embodiments described hereinafter excluding a fifth embodiment and a sixth embodiment (FIG. 8).

The adder 62 adds the corrected drive torque requirement Tfreq and the feed-back correction amount $\Delta$Tfb. An output of the adder 62, i.e. a signal indicative of the sum Tfreq+$\Delta$Tfb is input to the target engine output calculation block 42 and the adder 46 in the hybrid control section 34 as a signal indicative of a post-correction drive torque requirement Tareq. Accordingly, the function of the adder 40 shown in FIG. 2 is accomplished by the adders 58 and 62.

Thus, according to the first embodiment, the drive torque Tdsp for display is the total of the drive torque requirement Treq and the feed-forward correction amount $\Delta$Tff. The total is a value that does not include the feed-back correction amount $\Delta$Tfb, i.e. a value in which the influence of the feed-back correction amount $\Delta$Tfb is reduced to zero. Accordingly, the operation mode of the hybrid system 10 can be displayed on the display unit 32 without the influence of the feed-back correction amount $\Delta$Tfb. Therefore, the operation mode of the hybrid system 10 displayed on the display unit 32 can be prevented from changing frequently between the drive mode and the charging mode due to the influence of the feed-back correction amount $\Delta$Tfb, which enables to prevent vehicle occupants from feeling annoyance.

In particular, according to the first embodiment, the drive torque Tdsp for display is the total of the drive torque requirement Treq and the feed-forward correction amount $\Delta$Tff, and the total can be derived without conducting modification of the feed-back correction amount $\Delta$Tfb and the like. Accordingly, as compared with the case where the modification of the feed-back correction amount $\Delta$Tfb and the like are conducted, the vehicle control device can be made simpler.

It is to be understood that the post-correction drive torque requirement Tareq is the total of the drive torque requirement Treq and the feed-forward correction amount $\Delta$Tff, and the total is free from the influence of the calculation control of the drive torque Tdsp for display. Accordingly, the sprung vibrations can effectively be depressed without being affected by the calculation control of the drive torque Tdsp for display. The same goes for the second to ninth embodiments described later.

Second Embodiment

Figure 5:
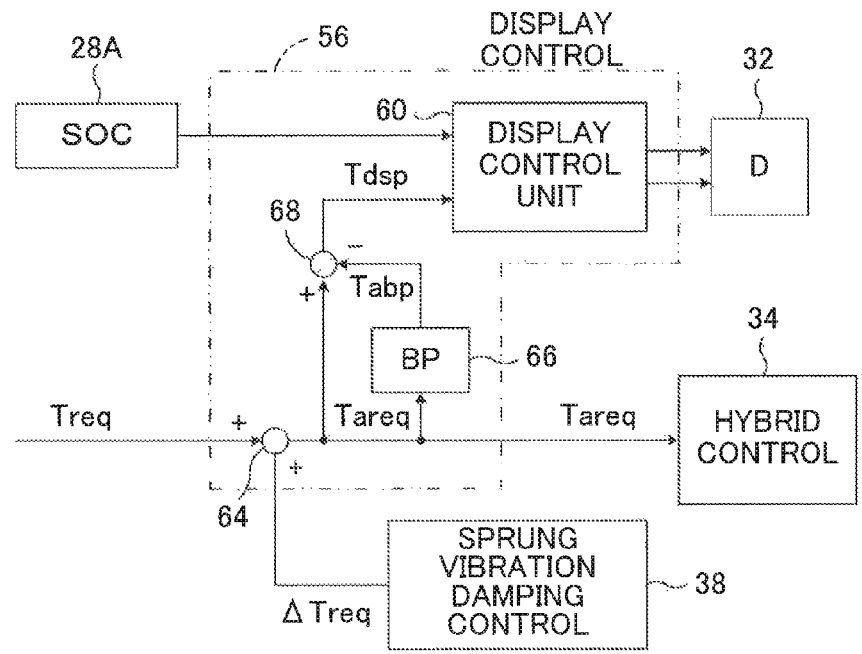
FIG. 5 is a functional block diagram showing the display control section together with the sprung vibration damping control section in the second embodiment of the present invention.

FIG. 5 is a functional block diagram showing the display control section together with the sprung vibration damping control section in the second embodiment of the present invention. In FIG. 5, the blocks corresponding to those shown in FIG. 4 are denoted by the same reference numbers as in FIG. 4. The same goes for the other embodiments shown in FIGS. 6 to 16.

In the second embodiment, the display control section 56 has an adder 64, which is supplied with a signal indicative of the drive torque correction amount $\Delta$Treq that is the total of the feed-forward correction amount $\Delta$Tff and the feed-back correction amount $\Delta$Tfb from the sprung vibration damping control section 38. The adder 64 adds the drive torque requirement Treq and the drive torque correction amount $\Delta$Treq to calculate a post-correction drive torque requirement Tareq. A signal indicative of the post-correction drive torque requirement Tareq is output to the target engine output calculation block 42 and the adder 46 in the hybrid control section 34 and is input to a band-pass filter block 66. Accordingly, the adder 64 functions similarly to the adder 40 shown in FIG. 2.

Lower and higher limits of resonant frequency range of the vehicle sprung body are represented by f1 and f2, respectively, and Lower and higher limits of the pass-band range of the band-pass filter block 66 are represented by fbp1 and fbp2, respectively. It is to be noted that fbp1 is not larger than #1 and fbp2 is equal to or larger than f2.

It is to be understood that while the lower limit fbp1 and the higher limit fbp2 of the pass-band range of the band-pass filter block 66 may be constant, they may be variably set in accordance with the changes in the resonant frequency range caused by the change in the number of vehicle occupants and a live load.

A signal indicative of the post-correction drive torque requirement Tabp which is band-pass filtered by the band-pass filter block 66 is input to a negative terminal of an adder 68. A positive terminal of the adder 68 is supplied with the post-correction drive torque requirement Tareq which is not band-pass filtered by the band-pass filter block 66. The adder 68 calculates a value "Tareq−Tabp" and a signal indicative of the value "Tareq−Tabp" is input to the display control unit 60 as a drive torque Tdsp for display.

Thus, according to the second embodiment, the drive torque Tdsp for display is a value equal to the post-correction drive torque requirement Tareq which is removed of the feed-back correction amount $\Delta$Tfb in a resonant frequency range of the vehicle sprung body. Accordingly, the drive torque Tdsp for display is the post-correction drive torque requirement Tareq which is modified so that the influence of the feed-back correction amount $\Delta$Tfb is reduced to zero with regard to the resonant frequency range of the vehicle sprung body.

Therefore, even when the sprung body vibrates at a resonant frequency, the operation mode of the hybrid system 10 displayed on the display unit 32 can be prevented from changing frequently between the drive mode and the charging mode due to the influence of the feed-back correction amount $\Delta$Tfb.

In particular, according to the second embodiment, the band-pass filtering process is conducted with respect to a particular frequency range which is not lower than fbp1$f$ but is not higher than fbp2$f$ and includes the resonant frequency range of the vehicle sprung body, and the feed-back correction amount $\Delta$Tfb is not removed from the post-correction drive torque requirement Tareq with respect to the other frequency ranges. Therefore, with respect to the frequency ranges other than the particular frequency range, the operation mode of the hybrid system 10 displayed on the display unit 32 can be made closer to the actual operation mode as compared with the case where the feed-back correction amount ΔTfb is removed from the post-correction drive torque requirement Tareq irrespective of the frequency. It is to be noted that this effect can as well be achieved in the seventh embodiment described later.

Third Embodiment

Figure 6:
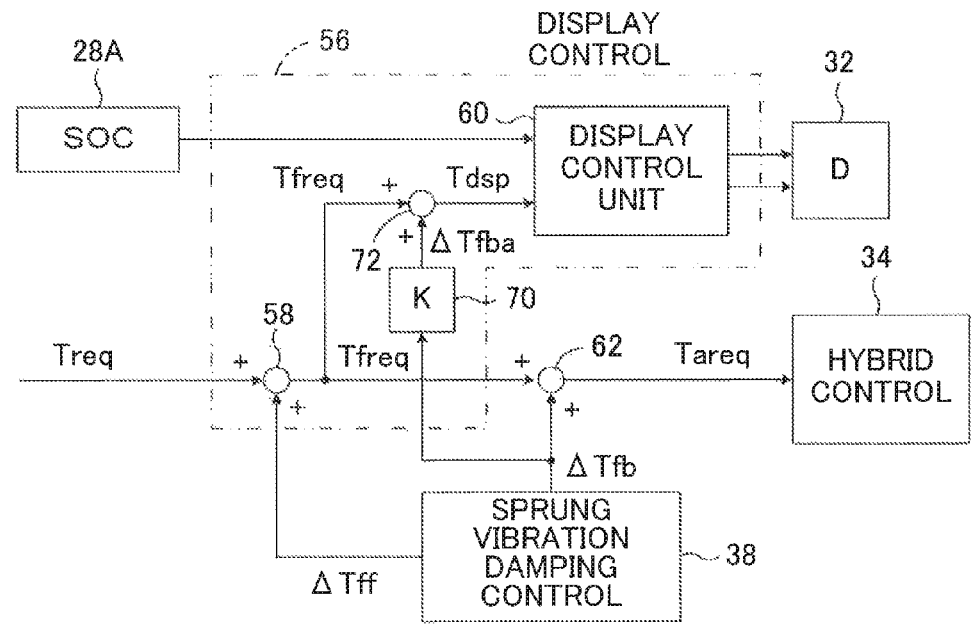
FIG. 6 is a functional block diagram showing the display control section together with the sprung vibration damping control section in the third embodiment of the present invention.

FIG. 6 is a functional block diagram showing the display control section together with the sprung vibration damping control section in the third embodiment of the present invention.

In the third embodiment, the display control section 56 has a gain multiplier 70 and an adder 72 in addition to the adder 58. The gain multiplier 70 is supplied with a signal indicative of the feed-back correction amount ΔTfb, and multiplies the feed-back correction amount ΔTfb by a gain K that is larger than 0 and smaller than 1 to calculate a decreasingly corrected feed-back correction amount ΔTfba.

It is to be understood that while the gain K may be constant, it is preferable to variably set the gain in accordance with the magnitude of the feed-back correction amount ΔTfb so that, for example, when the feed-back correction amount ΔTfb is large in magnitude, the gain becomes small as compared with the case where the amount ΔTfb is small in magnitude. In that case, the magnitude of the feed-back correction amount ΔTfb may be an average of or the maximum among the feed-back correction amounts ΔTfb in a predetermined first period of time.

A signal indicative of the decreasingly corrected feed-back correction amount ΔTfba is input to an adder 72. The adder 72 adds the decreasingly corrected feed-back correction amount ΔTfba and the drive torque requirement Tfreq corrected with the feed-forward correction amount ΔTff. A signal indicative of the sum Tfreq+ΔTfba which is the output of the adder is input to the display control unit 60 as a drive torque Tdsp for display.

According to the third embodiment, the drive torque Tdsp for display is the total of the decreasingly corrected feed-back correction amount ΔTfba and the drive torque requirement Tfreq corrected with the feed-forward correction amount ΔTff. Accordingly, the drive torque Tdsp for display is the post-correction drive torque requirement Tareq which is modified to reduce the influence of the feed-back correction amount ΔTfb.

Therefore, the possibility that the drive torque Tdsp for display alternates frequently between a positive and negative value can be reduced, whereby the possibility that the operation mode of the hybrid system 10 displayed on the display unit 32 changes frequently between the drive mode and the charging mode can be reduced.

In particular, according to the third embodiment, the drive torque Tdsp for display is the total of the decreasingly corrected feed-back correction amount ΔTfba and the drive torque requirement Tfreq corrected with the feed-forward correction amount ΔTff and reflects on the feed-back correction amount ΔTfb. Therefore, the operation mode of the hybrid system 10 displayed on the display unit 32 can be made closer to the actual operation mode as compared with the case where the drive torque Tdsp for display is the feed-forward correction amount ΔTff. It is to be noted that this effect can as well be achieved in the eighth embodiment described later.

Fourth Embodiment

Figure 7:
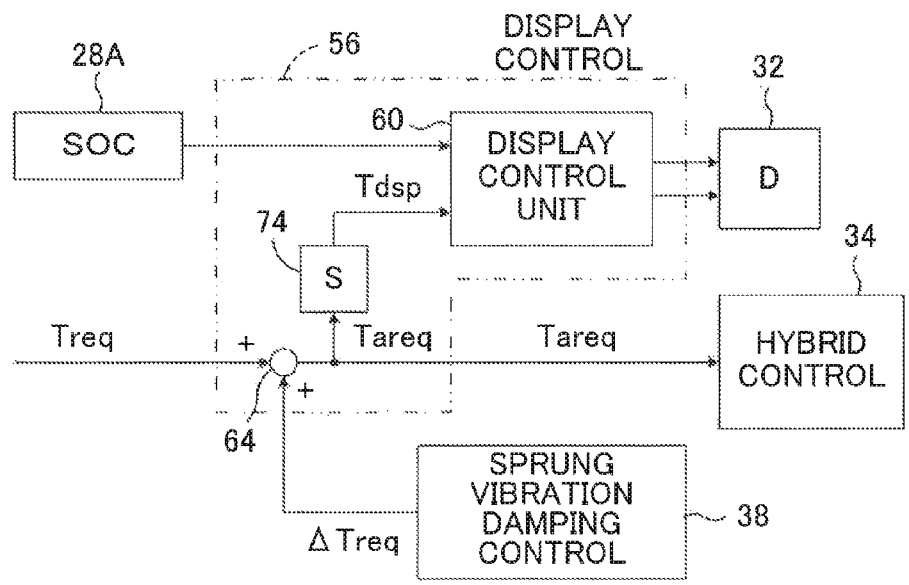
FIG. 7 is a functional block diagram showing the display control section together with the sprung vibration damping control section in the fourth embodiment of the present invention.

FIG. 7 is a functional block diagram showing the display control section together with the sprung vibration damping control section in the fourth embodiment of the present invention.

In the fourth embodiment, the display control section 56 has a sampling circuit 74 in addition to the adder 64. The sampling circuit 74 is supplied with a signal indicative of the post-correction drive torque requirement Tareq and conducts sampling of the post-correction drive torque requirement Tareq at a sampling cycle Cs of a prescribed value Csa. The output of the sampling circuit 74 is input to the display control unit 60 as the drive torque Tdsp for display.

The prescribed value Csa of the sampling cycle Cs is a cycle which is longer than the cycle (1/f1) that corresponds to the lower limit f1 of the resonant frequency range of the vehicle sprung body or shorter than the cycle (1/f2) that corresponds to the higher limit f2 of the resonant frequency range of the vehicle sprung body.

According to the fourth embodiment, the drive torque Tdsp for display is a value which is derived by sampling the post-correction drive torque requirement Tareq at a sampling cycle Cs of a prescribed value Csa. The prescribed value Csa of the sampling cycle Cs is a cycle which is other than the cycles that correspond to the resonant frequency range of the vehicle sprung body. Accordingly, the drive torque Tdsp for display is the post-correction drive torque requirement Tareq which is modified to reduce the influence of the feed-back correction amount ΔTfb with respect to the resonant frequency range of the vehicle sprung body.

Therefore, even when the sprung body vibrates at a resonant frequency, the possibility that the drive torque Tdsp for display alternates frequently between a positive and negative value can be reduced, whereby the operation mode of the hybrid system 10 displayed on the display unit 32 can be prevented from changing frequently between the drive mode and the charging mode due to the influence of the feed-back correction amount ΔTfb.

In particular, according to the fourth embodiment, with respect to the resonant frequency range of the vehicle sprung body, the drive torque Tdsp for display is a value which does not include the feed-back correction amount ΔTfb, and, in contrast, with respect to the frequencies outside the resonant frequency range of the vehicle sprung body, the drive torque Tdsp for display is a value which includes the feed-back correction amount ΔTfb. Therefore, the operation mode of the hybrid system 10 displayed on the display unit 32 can be made closer to the actual operation mode as compared with the case where the drive torque Tdsp for display is a value which does not include the feed-back correction amount ΔTfb irrespective of the frequency. It is to be noted that this effect can as well be achieved in the ninth embodiment described later.

Fifth Embodiment

FIG. 8 is a functional block diagram showing the display control section together with the sprung vibration damping control section in the fifth embodiment of the present invention which is configured as a modification of the first embodiment.

In the fifth embodiment, the display control unit 60 is supplied with a signal indicative of the drive torque requirement Tfreq corrected with the feed-forward correction amount ΔTff from the adder 58 and a signal indicative of the feed-back correction amount ΔTfb from the sprung vibration damping control section 38. The display control unit 60 displays the indication as to whether the operation mode of the hybrid system 10 is the drive mode or the charging mode in accordance with the correlation in sign and magnitude between the post-correction drive torque requirement Tfreq and the feed-back correction amount ΔTfb.

In particular, the display control unit 60 determines that the hybrid system 10 is in a prescribed operational situation when the post-correction drive torque requirement Tfreq and the feed-back correction amount ΔTfb are different in sign and ΔTfb is larger in magnitude than Tfreq. Under the condition where the hybrid system 10 is in the prescribed operational situation, when the sign of the feed-back correction amount ΔTfb is positive, the display control unit 60 displays on the display unit 32 the indication that the operation mode of the hybrid system 10 is the drive mode, In contrast, when the sign of the feed-back correction amount ΔTfb is negative, the display control unit 60 displays on the display unit 32 the indication that the operation mode of the hybrid system 10 is the charging mode.

The display control unit 60 determines that the hybrid system 10 is not in the prescribed operational situation when the post-correction drive torque requirement Tfreq and the feed-back correction amount ΔTfb are the same in sign and/or ΔTfb is not larger in magnitude than Tfreq. Under the condition where the hybrid system 10 is not in the prescribed operational situation, the display control unit 60 sets the drive torque Tdsp for display to the drive torque requirement Tfreq corrected with the feed-forward correction amount ΔTff. When the drive torque Tdsp for display is positive, the display control unit 60 displays on the display unit 32 the indication that the operation mode of the hybrid system 10 is the drive mode. In contrast, when the drive torque Tdsp for display is negative, the display control unit 60 displays on the display unit 32 the indication that the operation mode of the hybrid system 10 is the charging mode.

When the drive torque Tdsp for display is a value which is reduced in the influence of the feed-back correction amount ΔTfb as in the above-described first to fourth embodiments, the displayed operation mode of the hybrid system 10 may be different from the actual operation mode depending on situations.

That is, when the post-correction drive torque requirement Tfreq and the feed-back correction amount ΔTfb are different in sign and ΔTfb is larger in magnitude than Tfreq, the actual operation mode of the hybrid system 10 is determined by the sign of the feed-back correction amount ΔTfb. In contrast, however, even when the hybrid system 10 is in the above-described particular situation, the displayed operation mode of the hybrid system 10 is determined based on the sign of the post-correction drive torque requirement Tfreq and is different from the actual operation mode.

For that reason, in spite of the fact that the displayed operation mode of the hybrid system 10 is the drive mode, the indicated charge level may increase. Conversely, in spite of the fact that the displayed operation mode of the hybrid system 10 is the charging mode, the indicated charge level may decrease. Hence, the vehicle occupants may have a feeling of strangeness.

According to the fifth embodiment, when the hybrid system 10 is in the above-described particular situation, the operation mode of the hybrid system 10 is displayed in accordance with the sign of the feed-back correction amount ΔTfb. Accordingly, even when the hybrid system 10 is in the above-described particular situation, the indication of the operation mode of the hybrid system 10 on the display unit 32 can effectively be prevented from being different from the actual operation mode of the hybrid system 10.

It is to be understood that when the hybrid system 10 is not in the above-described particular situation, the drive torque Tdsp for display is the post-correction drive torque requirement Tfreq which is modified so that the influence of the feed-back correction amount ΔTfb is reduced to zero. Accordingly, when the hybrid system 10 is not in the above-described particular situation, as in the above-described first embodiment, the displayed operation mode can be prevented from changing frequently between the drive mode and the charging mode due to the influence of the feed-back correction amount ΔTfb.

Sixth Embodiment

The sixth embodiment is configured as a modification of the fifth embodiment and the display control section is configured as that in the fifth embodiment. In the sixth embodiment, the display control unit 60 determines that the hybrid system 10 is in the prescribed operational situation when the post-correction drive torque requirement Tfreq and the feed-back correction amount ΔTfb are different in sign and ΔTfb is larger in magnitude than Tfreq.

The display control unit 60 determines that the hybrid system 10 is not in the prescribed operational situation when the post-correction drive torque requirement Tfreq and the feed-back correction amount ΔTfb are the same in sign and/or ΔTfb is not larger in magnitude than Tfreq. Under the condition where the hybrid system 10 is not in the prescribed operational situation, the display control unit 60 displays on the display unit 32 the indication as to whether the operation mode of the hybrid system 10 is the drive mode or the charging mode in accordance with the sign of the drive torque Tdsp for display.

On the other hand, under the condition where the hybrid system 10 is in the prescribed operational situation, the display control unit 60 sets a value which is derived by subtracting the feed-back correction amount ΔTfb from the post-correction drive torque requirement Tfreq to set a reference value Tfreqs for determining situation. When the post-correction drive torque requirement Tfreq is larger than the reference value Tfreqs for determining situation, the display control unit 60 displays on the display unit 32 the indication that the operation mode of the hybrid system 10 is the drive mode. In contrast, when the post-correction drive torque requirement Tfreq is smaller than the reference value Tfreqs for determining situation, the display control unit 60 displays on the display unit 32 the indication that the operation mode of the hybrid system 10 is the charging mode.

The determination as to whether or not the post-correction drive torque requirement Tfreq is larger than the reference value Tfreqs for determining situation which is conducted in the sixth embodiment is equivalent to the determination as to whether or not the sign of the feed-back correction amount ΔTfb is positive which is conducted in the fifth embodiment.

Therefore, according to the sixth embodiment, in either case where the hybrid system 10 is or is not in the prescribed operational situation, the same effect as in the fifth embodiment can be achieved.

Seventh Embodiment

Figure 9:
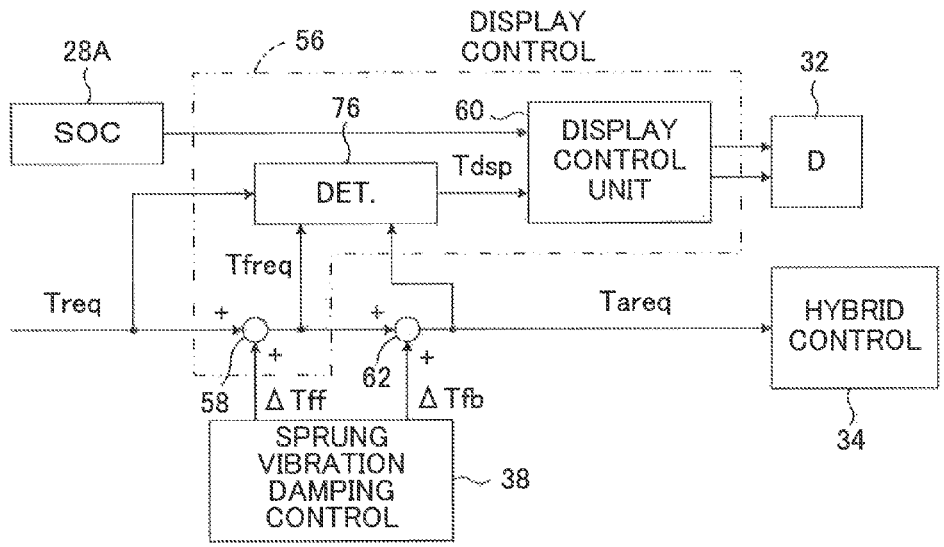
FIG. 9 is a functional block diagram showing the display control section together with the sprung vibration damping control section in the seventh embodiment of the present invention which is configured as a modification of the first embodiment.

FIG. 9 is a functional block diagram showing the display control section together with the sprung vibration damping control section in the seventh embodiment of the present invention which is configured as a modification of the first embodiment.

In the seventh embodiment, the display control section 56 has a determination block 76 in addition to the adder 58. The determination block 76 is supplied with a signal indicative of the drive torque requirement Treq from the drive torque requirement calculation block 36. The determination block 76 is also supplied with a signal indicative of the drive torque requirement Tfreq corrected with the feed-forward correction amount ΔTff from the adder 58 and is further supplied with a signal indicative of the post-correction drive torque requirement Tareq from the adder 62.

When the drive torque requirement Treq is not smaller in magnitude than a reference value Treqc, the determination block 76 sets the drive torque Tdsp for display to the post-correction drive torque requirement Tareq. In contrast, when the drive torque requirement Treq is smaller in magnitude than the reference value Treqc, the determination block 76 sets the drive torque Tdsp for display to a value which is derived by subtracting the feed-back correction amount Tfb from the post-correction drive torque requirement Tfreq. The signal indicative of the drive torque Tdsp for display is input to the display control unit 60.

It is to be understood that while the reference value Treqc may be a positive constant, it is preferable to variably set the reference value in accordance with the magnitude of the feed-back correction amount $\Delta$Tfb so that, for example, when the feed-back correction amount $\Delta$Tfb is large in magnitude, the reference value becomes large as compared with the case where the amount $\Delta$Tfb is small in magnitude. In that case, the magnitude of the feed-back correction amount $\Delta$Tfb may be an average of or the maximum among the feed-back correction amounts $\Delta$Tfb in a predetermined second period of time. The same goes for eighth to fourteenth embodiments described later.

Thus, according to the seventh embodiment, when the drive torque requirement Treq is smaller in magnitude than the reference value Treqc, the drive torque Tdsp for display is the total of the drive torque requirement Treq and the feed-forward correction amount $\Delta$Tff. Accordingly, the operation mode of the hybrid system 10 can be displayed on the display unit 32 without being affected by the influence of the feed-back correction amount $\Delta$Tfb which corresponds to a second drive output correction amount under a situation where the displayed operation mode of the hybrid system 10 is likely to be affected by the feed-back correction amount $\Delta$Tfb. Therefore, the operation mode of the hybrid system 10 displayed on the display unit 32 can be prevented from changing frequently between the drive mode and the charging mode due to the influence of the feed-back correction amount $\Delta$Tfb.

In particular, according to the seventh embodiment, when the drive torque requirement Treq is smaller in magnitude than the reference value Treqc, the drive torque Tdsp for display is the total of the drive torque requirement Treq and the feed-forward correction amount $\Delta$Tff. Accordingly, correction or the like on the feed-back correction amount $\Delta$Tfb is not required. Therefore, the vehicle control device can be made simpler in configuration as compared with the other embodiments in which correction or the like is conducted on the feed-back correction amount $\Delta$Tfb.

According to the seventh embodiment, the drive torque requirement Treq is changed to the drive torque requirement Tfreq corrected with the feed-forward correction amount $\Delta$Tff or the post-correction drive torque requirement Tareq in accordance with whether or not the drive torque requirement Treq is smaller in magnitude than the reference value Treqc. Accordingly, the operation mode of the hybrid system 10 displayed on the display unit 32 can be made closer to the actual operation mode as compared with the case where the drive torque Tdsp for display is set to the post-correction drive torque requirement Tfreq even when the drive torque requirement Treq is larger in magnitude than the reference value Treqc. It is to be noted that this effect can as well be achieved in the eleventh embodiment described later.

Eighth Embodiment

Figure 10:
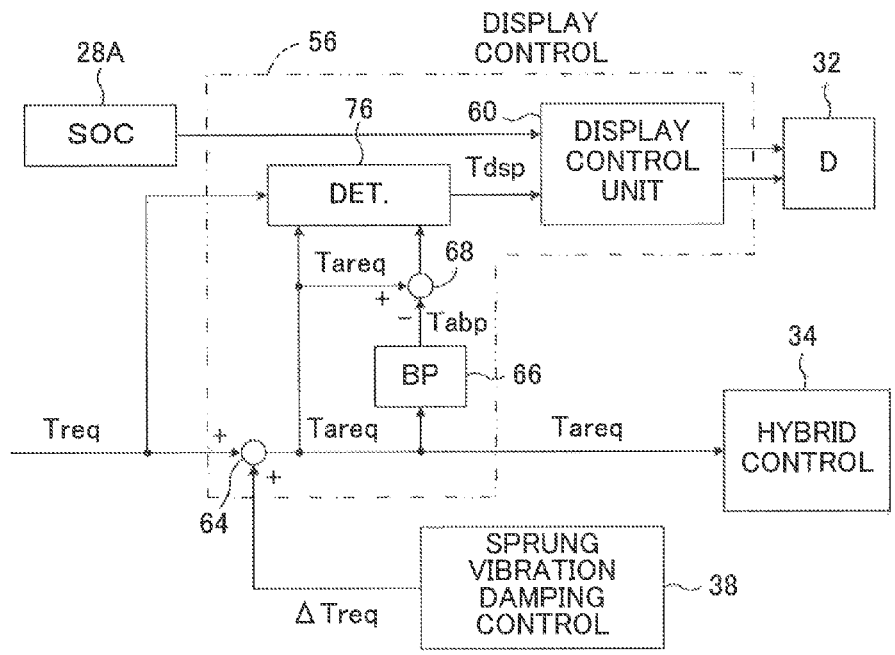
FIG. 10 is a functional block diagram showing the display control section together with the sprung vibration damping control section in the eighth embodiment of the present invention which is configured as a modification of the second embodiment.

FIG. 10 is a functional block diagram showing the display control section together with the sprung vibration damping control section in the eighth embodiment of the present invention which is configured as a modification of the second embodiment.

In the eighth embodiment, the determination block 76 is supplied with a signal indicative of Tareq−Tabp from the adder 68 in addition to the signals indicative of the drive torque requirement Treq and the post-correction drive torque requirement Tareq.

When the drive torque requirement Treq is not smaller in magnitude than the reference value Treqc, the determination block 76 sets the drive torque Tdsp for display to the post-correction drive torque requirement Tareq. In contrast, when the drive torque requirement Treq is smaller in magnitude than the reference value Treqc, the determination block 76 sets the drive torque Tdsp for display to the value Tareq−Tabp. The signal indicative of the drive torque Tdsp for display is input to the display control unit 60.

According to the eighth embodiment, when the drive torque requirement Treq is smaller in magnitude than the reference value Treqc, the drive torque Tdsp for display is a value which is derived by removing the feed-back correction amount $\Delta$Tfb from the post-correction drive torque requirement Tareq with respect to a resonant frequency range of the vehicle sprung body. Accordingly, the operation mode of the hybrid system 10 can be displayed on the display unit 32 with the influence of the feed-back correction amount $\Delta$Tfb being reduced in a situation where the displayed operation mode of the hybrid system 10 is likely to be affected by the feed-back correction amount $\Delta$Tfb.

Therefore, even when the vehicle sprung body vibrates at a resonant frequency, the displayed operation mode of the hybrid system 10 can be prevented from changing frequently between the drive mode and the charging mode due to the influence of the feed-back correction amount $\Delta$Tfb.

Ninth Embodiment

Figure 11:
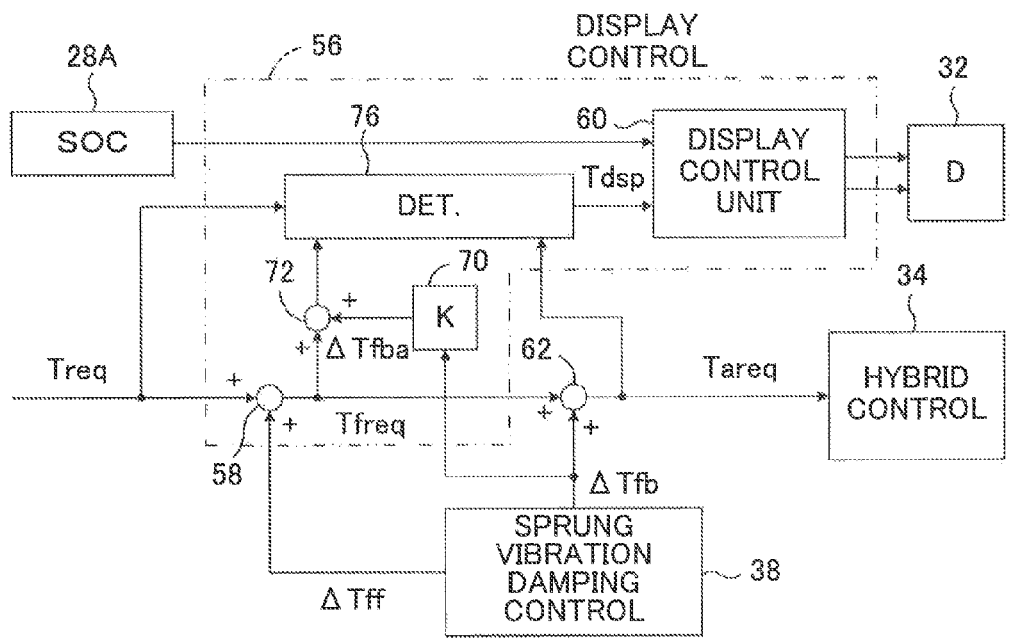
FIG. 11 is a functional block diagram showing the display control section together with the sprung vibration damping control section in the ninth embodiment of the present invention which is configured as a modification of the third embodiment.

FIG. 11 is a functional block diagram showing the display control section together with the sprung vibration damping control section in the ninth embodiment of the present invention which is configured as a modification of the third embodiment.

In the ninth embodiment, the determination block 76 is supplied with a signal indicative of a total of the post-correction drive torque requirement Tfreq and the decreasingly corrected feed-back correction amount $\Delta$Tfba from the adder 72 in addition to the signals indicative of the drive torque requirement Treq and the post-correction drive torque requirement Tareq.

When the drive torque requirement Treq is not smaller in magnitude than the reference value Treqc, the determination block 76 sets the drive torque Tdsp for display to the post-correction drive torque requirement Tareq. In contrast, when the drive torque requirement Treq is smaller in magnitude than the reference value Treqc, the determination block 76 sets the drive torque Tdsp for display to the total of Tfreq and $\Delta$Tfba. The signal indicative of the drive torque Tdsp for display is input to the display control unit 60.

According to the ninth embodiment, when the drive torque requirement Treq is smaller in magnitude than a reference value Treqc, the drive torque Tdsp for display is the total of the decreasingly corrected feed-back correction amount $\Delta$Tfba and the drive torque requirement Tfreq corrected with the feed-forward correction amount $\Delta$Tff. Accordingly, the drive torque Tdsp for display is the post-correction drive torque requirement Tareq which is modified so that the influence of the feed-back correction amount $\Delta$Tfb is reduced.

Therefore, the possibility that the drive torque Tdsp for display alternates frequently between a positive and negative value can be reduced when the drive torque requirement Treq is smaller in magnitude than a reference value Treqc, whereby the possibility that the displayed operation mode of the hybrid system 10 changes frequently between the drive mode and the charging mode can be reduced.

Tenth Embodiment

Figure 12:
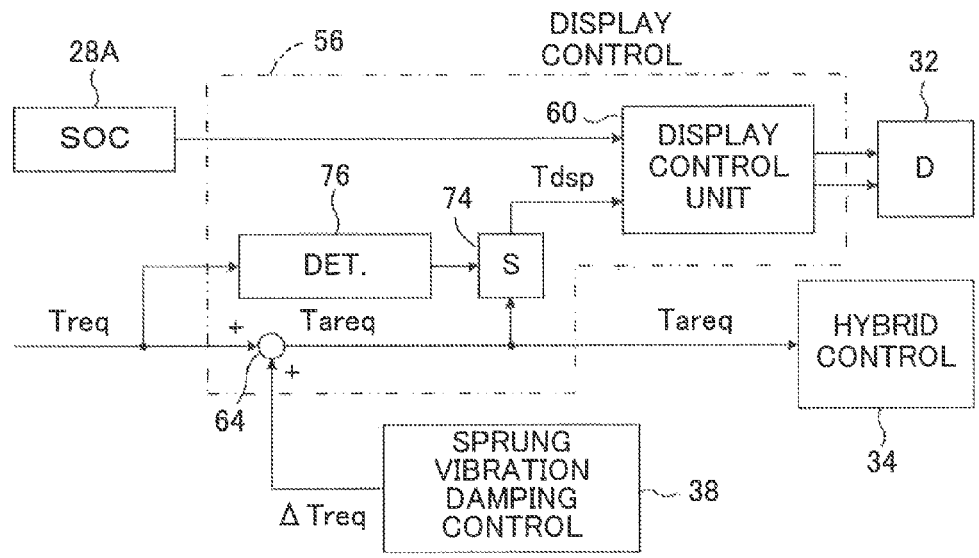
FIG. 12 is a functional block diagram showing the display control section together with the sprung vibration damping control section in the tenth embodiment of the present invention which is configured as a modification of the fourth embodiment.

FIG. 12 is a functional block diagram showing the display control section together with the sprung vibration damping control section in the tenth embodiment of the present invention which is configured as a modification of the fourth embodiment.

In the tenth embodiment, the determination block 76 is supplied solely with a signal indicative of the drive torque requirement Treq. When the drive torque requirement Treq is not smaller in magnitude than the reference value Treqc, the determination block 76 sets the sampling cycle of the sampling circuit 74 to a normal value Csn. In contrast, when the drive torque requirement Treq is smaller in magnitude than the reference value Treqc, the determination block 76 sets the sampling cycle of the sampling circuit 74 to the prescribed value Csa.

The sampling circuit 74 conducts sampling of the post-correction drive torque requirement Tareq at a sampling cycle Cs of Csn or Csa and the output of the sampling circuit 74 is input to the display control unit 60 as the drive torque Tdsp for display.

As is the case with the fourth embodiment, the prescribed value Csa of the sampling cycle Cs is a cycle which is longer than the cycle (1/f1) that corresponds to the lower limit f1 of the resonant frequency range of the vehicle sprung body or shorter than the cycle (1/f2) that corresponds to the higher limit f2 of the resonant frequency range of the vehicle sprung body.

According to the tenth embodiment, when the drive torque requirement Treq is smaller in magnitude than the reference value Treqc, the determination block 76 conducts sampling of the post-correction drive torque requirement Tareq at the sampling cycle of the prescribed Csa. Accordingly, the drive torque Tdsp for display is the post-correction drive torque requirement Tareq which is modified so that the influence of the feed-back correction amount ΔTfb is reduced.

Therefore, even when the vehicle sprung body vibrates at a resonant frequency, the displayed operation mode of the hybrid system 10 can be prevented from changing frequently between the drive mode and the charging mode due to the influence of the feed-back correction amount ΔTfb.

Eleventh Embodiment

Figure 13:
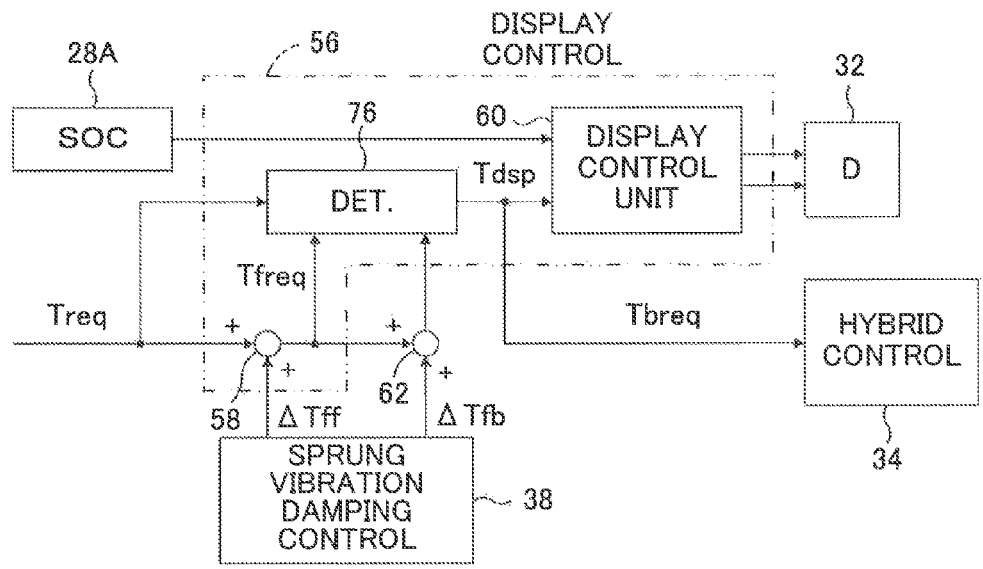
FIG. 13 is a functional block diagram showing the display control section together with the sprung vibration damping control section in the eleventh embodiment of the present invention which is configured as a modification of the seventh embodiment.

FIG. 13 is a functional block diagram showing the display control section together with the sprung vibration damping control section in the eleventh embodiment of the present invention which is configured as a modification of the seventh embodiment.

In the eleventh embodiment, when the drive torque requirement Treq is not smaller in magnitude than the reference value Treqc, the determination block 76 sets the drive torque Tdsp for display to the post-correction drive torque requirement Tareq. The signal indicative of the post-correction drive torque requirement Tareq is output to the target engine output calculation block 42 and the adder 46 in the hybrid control section 34 as a drive torque requirement Tbreq.

In contrast, when the drive torque requirement Treq is smaller in magnitude than the reference value Treqc, the determination block 76 sets the drive torque Tdsp for display to a value which is derived by subtracting the feed-back correction amount ΔTfb from the post-correction drive torque requirement Tfreq. The signal indicative of the value derived by subtracting the feed-back correction amount ΔTfb from the post-correction drive torque requirement Tfreq is output to the target engine output calculation block 42 and the adder 46 in the hybrid control section 34.

According to the eleventh embodiment, as is the case with the sixth embodiment, the displayed operation mode of the hybrid system 10 can be prevented from changing frequently between the drive mode and the charging mode due to the influence of the feed-back correction amount ΔTfb.

It is to be noted that according to the eleventh embodiment, the engine 12 and the electric motor 14 are controlled based on a target drive torque which is the same as the drive torque Tdsp for display. The same goes for the twelfth to fourteenth embodiments described later.

Twelfth Embodiment

Figure 14:
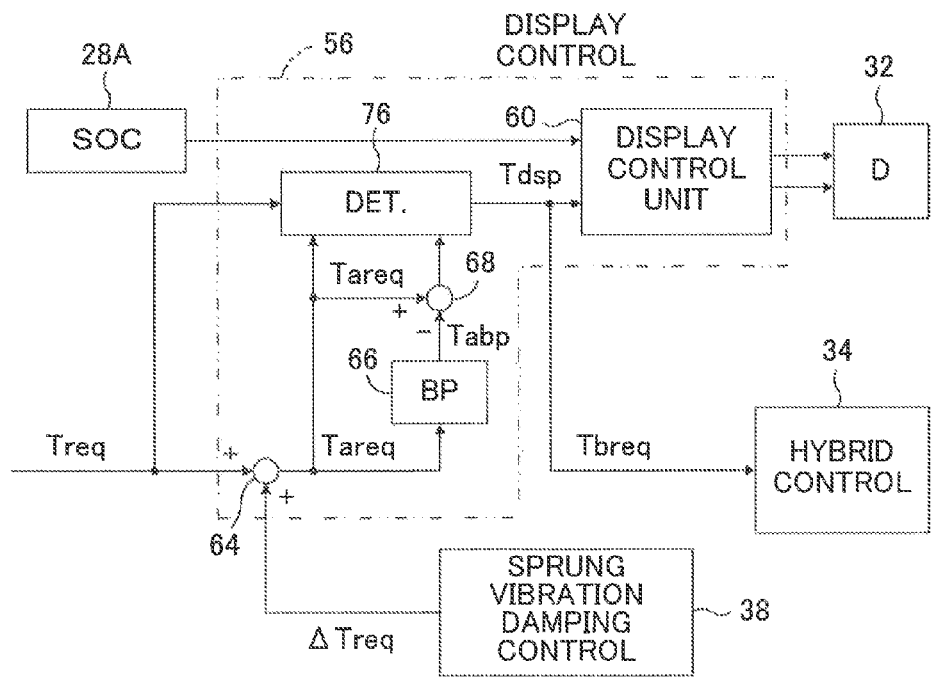
FIG. 14 is a functional block diagram showing the display control section together with the sprung vibration damping control section in the twelfth embodiment of the present invention which is configured as a modification of the seventh embodiment.

FIG. 14 is a functional block diagram showing the display control section together with the sprung vibration damping control section in the twelfth embodiment of the present invention which is configured as a modification of the seventh embodiment.

In the twelfth embodiment, when the drive torque requirement Treq is not smaller in magnitude than the reference value Treqc, the determination block 76 sets the drive torque Tdsp for display to the post-correction drive torque requirement Tareq. The signal indicative of the post-correction drive torque requirement Tareq is output to the target engine output calculation block 42 and the adder 46 in the hybrid control section 34.

In contrast, when the drive torque requirement Treq is smaller in magnitude than the reference value Treqc, the determination block 76 sets the drive torque Tdsp for display to a value of Tareq−Tabp. The signal indicative of the value of Tareq−Tabp is input to the target engine output calculation block 42 and the adder 46 in the hybrid control section 34.

Hence, according to the twelfth embodiment, the same effect as in the eighth embodiment can be achieved. That is, even when the vehicle sprung body vibrates at a resonant frequency, the displayed operation mode of the hybrid system 10 can be prevented from changing frequently between the drive mode and the charging mode due to the influence of the feed-back correction amount ΔTfb.

Thirteenth Embodiment

Figure 15:
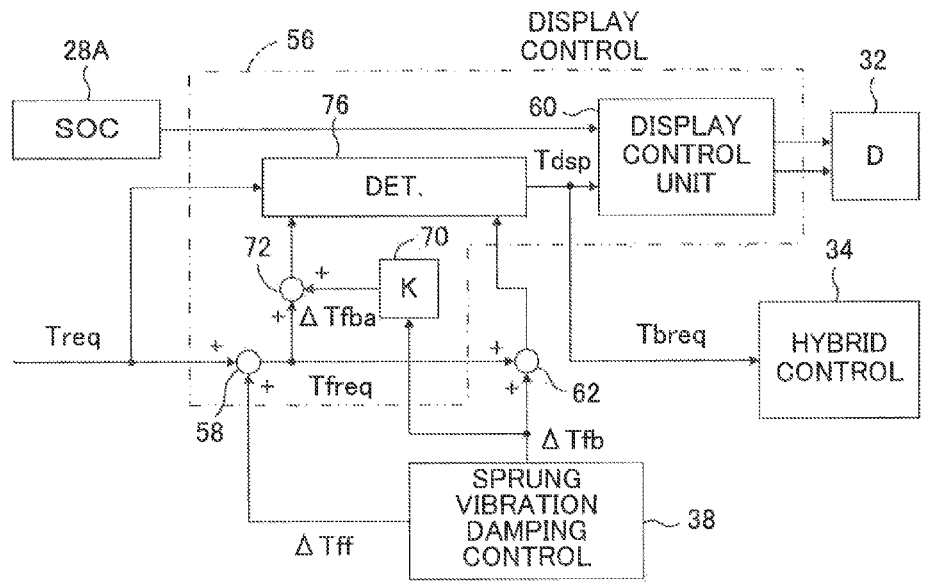
FIG. 15 is a functional block diagram showing the display control section together with the sprung vibration damping control section in the thirteenth embodiment of the present invention which is configured as a modification of the eighth embodiment.

FIG. 15 is a functional block diagram showing the display control section together with the sprung vibration damping control section in the thirteenth embodiment of the present invention which is configured as a modification of the eighth embodiment.

In the thirteenth embodiment, when the drive torque requirement Treq is not smaller in magnitude than the reference value Treqc, the determination block 76 sets the drive torque Tdsp for display to the post-correction drive torque requirement Tareq. The signal indicative of the post-correction drive torque requirement Tareq is output to the target engine output calculation block 42 and the adder 46 in the hybrid control section 34.

In contrast, when the drive torque requirement Treq is smaller in magnitude than the reference value Treqc, the determination block 76 sets the drive torque Tdsp for display to a total of Tfreq and ΔTfba. The signal indicative of the total of Tfreq and ΔTfba is input to the target engine output calculation block 42 and the adder 46 in the hybrid control section 34.

According to the thirteenth embodiment, the same effect as in the ninth embodiment can be achieved. That is, the possibility that the drive torque Tdsp for display alternates frequently between a positive and negative value can be reduced when the drive torque requirement Treq is smaller in magnitude than the reference value Treqc, whereby the possibility that the displayed operation mode changes frequently between the drive mode and the charging mode can be reduced.

Fourteenth Embodiment

Figure 16:
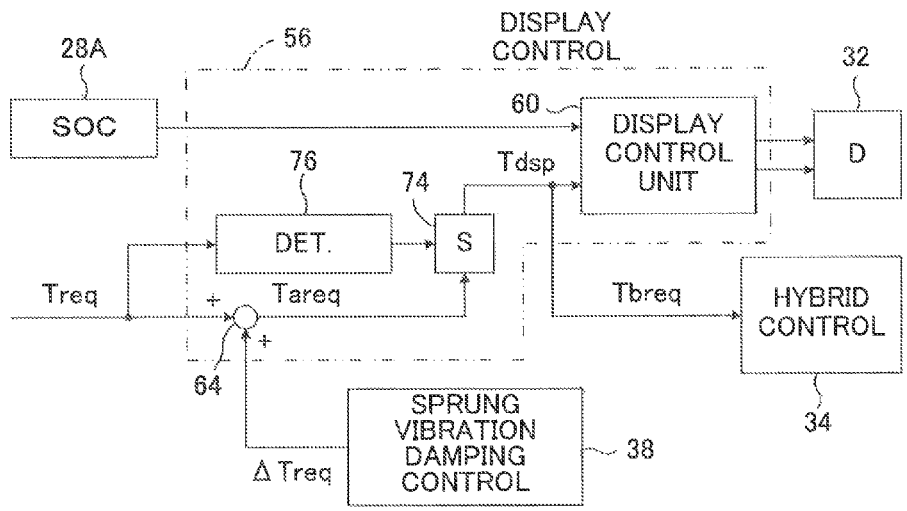
FIG. 16 is a functional block diagram showing the display control section together with the sprung vibration damping control section in the fourteenth embodiment of the present invention which is configured as a modification of the ninth embodiment.

FIG. 16 is a functional block diagram showing the display control section together with the sprung vibration damping control section in the fourteenth embodiment of the present invention which is configured as a modification of the ninth embodiment.

In the fourteenth embodiment, when the drive torque requirement Treq is not smaller in magnitude than the reference value Treqc, the determination block 76 sets the sampling cycle of the sampling circuit 74 to a normal value Csn. In contrast, when the drive torque requirement Treq is smaller in magnitude than the reference value Treqc, the determination block 76 sets the sampling cycle of the sampling circuit 74 to the prescribed value Csa.

The sampling circuit 74 conducts sampling of the post-correction drive torque requirement Tareq at a sampling cycle Cs of Csn or Csa and the output of the sampling circuit 74 is input to the display control unit 60 as the drive torque Tdsp for display. The output of the sampling circuit 74 is also input to the target engine output calculation block 42 and the adder 46 in the hybrid control section 34.

According to the fourteenth embodiment, the same effect as in the tenth embodiment can be achieved. That is, even when the vehicle sprung body vibrates at a resonant frequency, the operation mode of the hybrid system 10 displayed on the display unit 32 can be prevented from changing frequently between the drive mode and the charging mode due to the influence of the feed-back correction amount $\Delta Tfb$.

First Modified Embodiment

Figure 17:
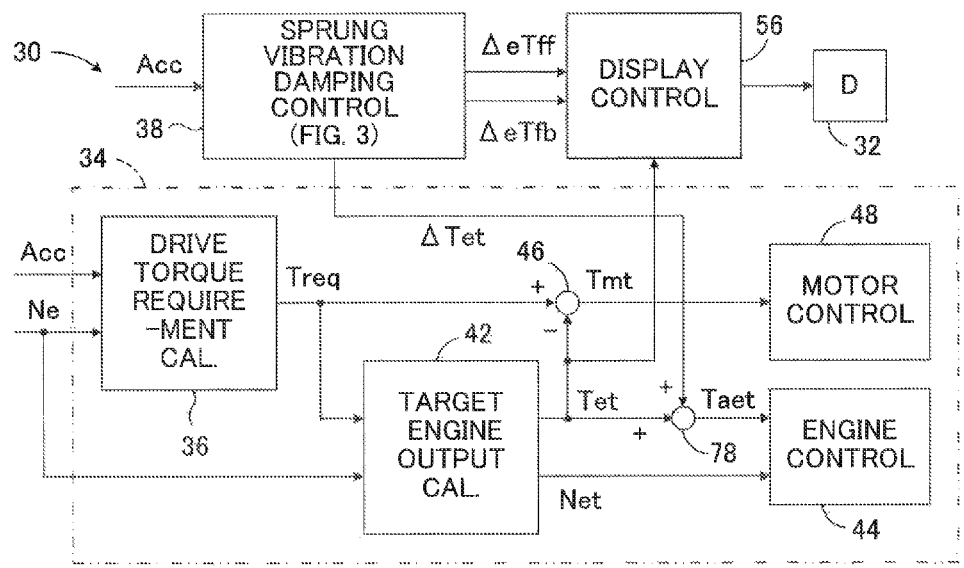
FIG. 17 is a functional block diagram showing a first modified embodiment of the vehicle control device of the present invention together with the sprung vibration damping control section and the display control section.

FIG. 17 is a functional block diagram showing a first modified embodiment of the vehicle control device of the present invention together with the sprung vibration damping control section and the display control section.

In the first modified embodiment, the sprung vibration damping control section 38 calculates a feed-forward correction amount $\Delta Teff$ and a feed-back correction amount $\Delta Tefb$ of the target drive torque Tet of the engine 12 for suppressing the sprung body vibrations. The signals indicative of the feed-forward correction amount $\Delta Teff$ and the feed-back correction amount $\Delta Tefb$ are input to the display control section 56. The display control section 56 controls the display unit 32 on the basis of at least the feed-forward correction amount $\Delta Teff$ in the same manner as that in either of the first to tenth embodiments.

The sprung vibration damping control section 38 calculates a correction amount $\Delta Tet$ of the target drive torque Tet of the engine 12 for suppressing the sprung body vibrations on the basis of the feed-forward correction amount $\Delta Teff$ and the feed-back correction amount $\Delta Tefb$ in the same manner as in either of the first to tenth embodiments. The correction amount $\Delta Tet$ is added to the target drive torque Tet of the engine 12 by an adder 78 to calculate a post-corrected target drive torque (a corrected target drive torque) Taet. The engine control section 44 is supplied with a signal indicative of the post-corrected target drive torque Taet, and controls the engine 12 based on the post-corrected target drive torque Taet and a target engine speed Net.

Hence, according to the first modified embodiment, the indication on the display unit 32 can be controlled in the same manner as in either of the first to tenth embodiments except that correction amounts $\Delta Teff$, $\Delta Tefb$ and $\Delta Tet$ are calculated with regard to the target drive torque Tet of the engine 12. The displayed operation mode of the hybrid system 10 can be prevented or suppressed from changing frequently between the drive mode and the charging mode due to the influence of the feed-back correction amount $\Delta Tefb$.

Second Modified Embodiment

Figure 18:
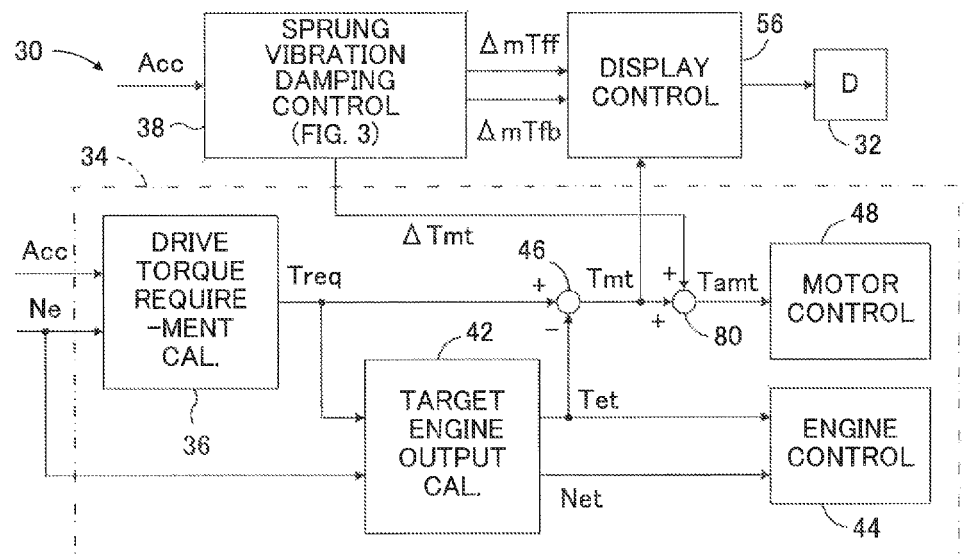
FIG. 18 is a functional block diagram showing a second modified embodiment of the vehicle control device of the present invention together with the sprung vibration damping control section and the display control section.

FIG. 18 is a functional block diagram showing a second modified embodiment of the vehicle control device of the present invention together with the sprung vibration damping control section and the display control section.

In the second modified embodiment, the sprung vibration damping control section 38 calculates a feed-forward correction amount $\Delta Tmff$ and a feed-back correction amount $\Delta Tmfb$ of a target drive torque Tmt of the electric motor 14 for suppressing the sprung body vibrations. The signals indicative of the feed-forward correction amount $\Delta Tmff$ and the feed-back correction amount $\Delta Tmfb$ are input to the display control section 56. The display control section 56 controls the display unit 32 on the basis of at least the feed-forward correction amount $\Delta Tmff$ in the same manner as in either of the first to tenth embodiments.

The sprung vibration damping control section 38 calculates a correction amount $\Delta Tmt$ of the target drive torque Tmt of the electric motor 14 for suppressing the sprung body vibrations on the basis of the feed-forward correction amount $\Delta Tmff$ and the feed-back correction amount $\Delta Tmfb$ in the same manner as in either of the first to tenth embodiments. The correction amount $\Delta Tmt$ is added to the target drive torque Tmt of the electric motor 14 by an adder 80 to calculate a post-correction target drive torque Tamt. The motor control section 48 is supplied with a signal indicative of the post-correction target drive torque Tamt, and controls the electric motor 14 based on the post-correction target drive torque Tamt.

Hence, according to the second modified embodiment, the indication on the display unit 32 can be controlled in the same manner as in either of the first to tenth embodiments except that correction amounts $\Delta Tmff$, $\Delta Tmfb$ and $\Delta Tmt$ are calculated with regard to the target drive torque Tmt of the electric motor 14. Accordingly, the displayed operation mode of the hybrid system 10 can be prevented or suppressed from changing frequently between the drive mode and the charging mode due to the influence of the feed-back correction amount $\Delta Tmfb$.

Third Modified Embodiment

Figure 19:
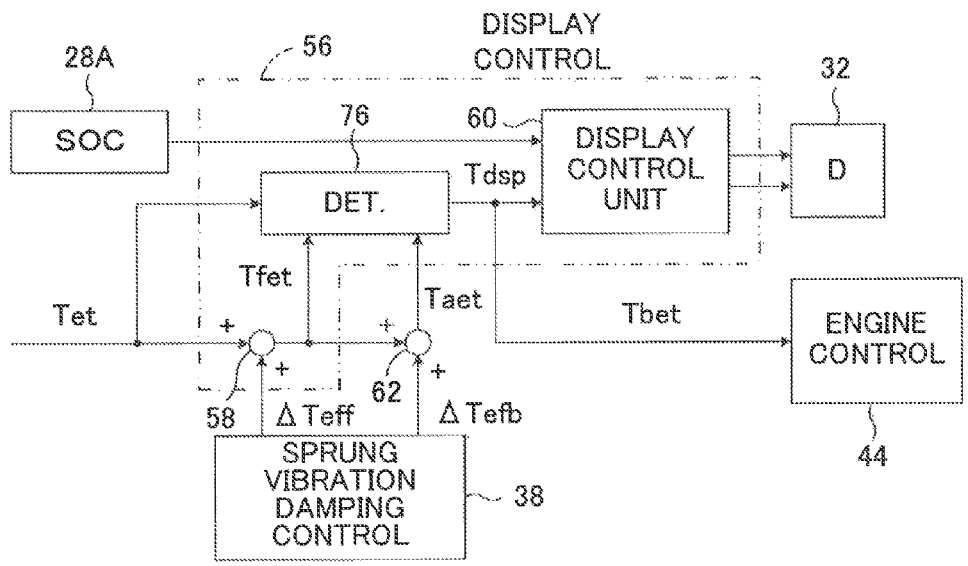
FIG. 19 is a functional block diagram showing a third modified embodiment of the vehicle control device of the present invention which is configured as a modification of the eleventh embodiment together with the sprung vibration damping control section and the display control section.

FIG. 19 is a functional block diagram showing a third modified embodiment of the vehicle control device of the present invention which is configured as a modification of the eleventh embodiment together with the sprung vibration damping control section and the display control section.

In the third modified embodiment, the sprung vibration damping control section 38 calculates a feed-forward correction amount $\Delta Teff$ and a feed-back correction amount $\Delta Tefb$ of the target drive torque Tet of the engine 12 for suppressing the sprung body vibrations. The feed-forward correction amount $\Delta Teff$ is added to the target drive torque Tet of the engine 12 by the adder 58 to calculate a post-correction target drive torque Tfet. The post-correction target drive torque Tfet is in turn added to the feed-back correction amount $\Delta Tefb$ by the adder 62 to calculate a post-correction target drive torque Taet. The signals indicative of the post-correction target drive torque Tfet and the post-correction target drive torque Taet are input to the determination block 76.

When the target drive torque Tet of the engine 12 is not smaller in magnitude than a reference value Tetc, the determination block 76 sets the drive torque Tdsp for display to the post-correction target drive torque Taet. The signal indicative of the post-correction target drive torque Taet is output to the engine control section 44.

In contrast, when the target drive torque Tet of the engine 12 is smaller in magnitude than the reference value Tetc, the determination block 76 sets the drive torque Tdsp for display to a value which is derived by subtracting the feed-back correction amount ΔTefb from the post-correction target drive torque Taet. The signal indicative of the value derived by subtracting the feed-back correction amount ΔTefb from the post-correction target drive torque Taet is output to the engine control section 44.

It is to be understood that while the reference value Tetc may be a positive constant, it is preferable to variably set the reference value in accordance with the magnitude of the feed-back correction amount ΔTefb so that, for example, when the feed-back correction amount ΔTefb is large in magnitude, the reference value becomes large as compared with the case where the amount ΔTefb is small in magnitude. In that case, the magnitude of the feed-back correction amount ΔTefb may be an average of or the maximum among the feed-back correction amounts ΔTefb in a predetermined third period of time.

According to the third modified embodiment, the indication on the display unit 32 can be controlled in the same manner as in the eleventh embodiment except that correction amounts ΔTeff, ΔTefb and ΔTet are calculated with regard to the target drive torque Tet of the engine 12. Accordingly, the displayed operation mode of the hybrid system 10 can be prevented from changing frequently between the drive mode and the charging mode due to the influence of the feed-back correction amount ΔTefb.

It is to be understood that the same modification as the third modified embodiment may be applied to either of the above-described twelfth to fourteenth embodiments.

Fourth Modified Embodiment

Figure 20:
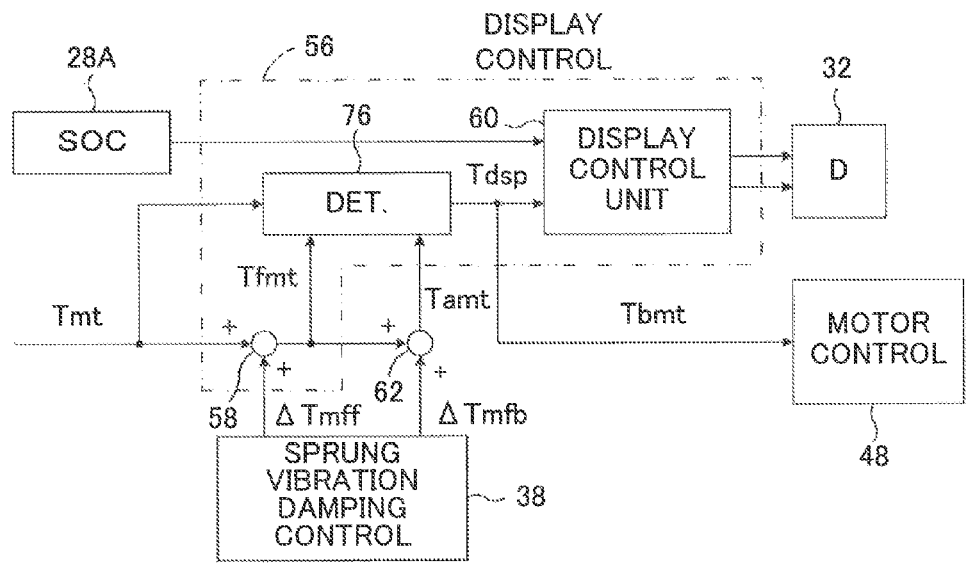
FIG. 20 is a functional block diagram showing a fourth modified embodiment of the vehicle control device of the present invention which is configured as a modification of the eleventh embodiment together with the sprung vibration damping control section and the display control section.

FIG. 20 is a functional block diagram showing a fourth modified embodiment of the vehicle control device of the present invention which is configured as a modification of the eleventh embodiment together with the sprung vibration damping control section and the display control section.

In the fourth modified embodiment, the sprung vibration damping control section 38 calculates a feed-forward correction amount ΔTmff and a feed-back correction amount ΔTmfb of a target drive torque Tmt of the electric motor 14 for suppressing the sprung body vibrations. The feed-forward correction amount ΔTmff is added to the target drive torque Tmt of the electric motor 14 by the adder 58 to calculate a post-correction target drive torque Tfmt. The post-correction target drive torque Tfmt is in turn added to the feed-back correction amount ΔTmfb by the adder 62 to calculate a post-correction target drive torque Tamt. The signals indicative of the post-correction target drive torque Tfmt and the post-correction target drive torque Tamt are input to the determination block 76.

When the target drive torque Tmt of the electric motor 14 is not smaller in magnitude than a reference value Tmtc, the determination block 76 sets the drive torque Tdsp for display to the post-correction target drive torque Tamt. The signal indicative of the post-correction target drive torque Tamt is output to the motor control section 48.

In contrast, when the target drive torque Tmt of the electric motor 14 is smaller in magnitude than the reference value Tmtc, the determination block 76 sets the drive torque Tdsp for display to a value which is derived by subtracting the feed-back correction amount ΔTmfb from the post-correction target drive torque Tamt. The signal indicative of the value derived by subtracting the feed-back correction amount ΔTmfb from the post-correction target drive torque Tamt is output to the motor control section 48.

It is to be understood that while the reference value Tmtc may be a positive constant, it is preferable to variably set the reference value in accordance with the magnitude of the feed-back correction amount ΔTmfb so that, for example, when the feed-back correction amount ΔTmfb is large in magnitude, the reference value becomes large as compared with the case where the amount ΔTmfb is small in magnitude. In that case, the magnitude of the feed-back correction amount ΔTmfb may be an average of or the maximum among the feed-back correction amounts ΔTefb in a predetermined fourth period of time.

According to the fourth modified embodiment, the indication on the display unit 32 can be controlled as in the eleventh embodiment except that correction amounts ΔTmff, ΔTmfb and ΔTmt are calculated with regard to the target drive torque Tmt of the electric motor 14. Accordingly, the displayed operation mode of the hybrid system 10 can be prevented from changing frequently between the drive mode and the charging mode due to the influence of the feed-back correction amount ΔTmfb.

It is to be understood that the same modification as the fourth modified embodiment may be applied to either of the above-described twelfth to fourteenth embodiments.

While the present invention has been described with reference to the above embodiments, it will be apparent to those skilled in the art that the present invention is not limited thereto, but may be embodied in various other forms without departing from the scope of the invention.

For example, while the above-described fifth and sixth embodiments are configured as a modification of the first embodiment, the configuration of the fifth or sixth embodiment may be applied to either of the second to fourth embodiments.

That is, in either of the second to fourth embodiments, when the drive torque Tdsp for display and the feed-back correction amount ΔTfb are different in sign and ΔTfb is larger in magnitude than Tfreq, the hybrid system 10 is determined to be in the prescribed operational situation. Under the condition where the hybrid system 10 is in the prescribed operational situation, when the sign of the feed-back correction amount ΔTfb is positive, the indication is displayed that the operation mode of the hybrid system 10 is the drive mode. In contrast, when the sign of the feed-back correction amount ΔTfb is negative, the indication is displayed that the operation mode of the hybrid system 10 is the charging mode.

When the drive torque Tdsp for display and the feed-back correction amount ΔTfb are the same in sign or ΔTfb is not larger in magnitude than Tfreq, the hybrid system 10 is determined not to be in the prescribed operational situation. Under the condition where the hybrid system 10 is not in the prescribed operational situation, when the drive torque Tdsp for display is positive, the indication is displayed that the operation mode of the hybrid system 10 is the drive mode. In contrast, when the sign of the drive torque Tdsp for display is negative, the indication is displayed that the operation mode of the hybrid system 10 is the charging mode.

In the above-described second, eighth and twelfth embodiments, a band-pass filtering process is conducted with the upper and lower limit values of fbp1 and fbp2 of the pass-band. However, a combination of a low-pass filtering process having a cut-off frequency of fbp1 and a high-pass filtering process having a cut-off frequency of fbp2 may be adopted or only one of the filtering processes may be adopted.

In the above-described embodiments, a drive torque correction amount ΔTreq for suppressing the vibration of the vehicle sprung body accompanying the driving operation by a driver is calculated, and a drive torque requirement Treq is corrected with a drive torque correction amount ΔTreq to calculate a post-correction drive torque requirement Tareq.

However, the present invention may be applied to the case where a brake torque correction amount for suppressing the vibration of the vehicle sprung body accompanying the braking operation by a driver is calculated, and a brake torque requirement is corrected with a brake torque correction amount to calculate a post-correction brake torque requirement.

In that case, the brake torque correction amount may comprise a first brake torque correction amount calculated on the basis of at least the amount of braking operation by a driver and a second brake torque correction amount calculated on the basis of disturbance on the vehicle. The display unit 32 serving as a display means may be configured to indicate the running force output state on the basis of a corrected brake torque requirement for display which is a value having less influence of the second brake torque correction amount than the corrected brake torque requirement.

While the vehicle is a hybrid system vehicle in the above-described embodiments, the vehicle control device of the present invention may be applied to an electric vehicle conducting regeneration during deceleration braking.

The invention claimed is:

1. A vehicle control device comprising:
   a target running force output value calculation unit which calculates a target running force output value for a vehicle on the basis of the amount of driving operation by a driver;
   a running force output correction amount calculation unit which calculates a target running force output correction amount for suppressing vibration of the vehicle;
   a control unit which controls a running force output device of the vehicle on the basis of a post-correction target running force output value which is derived by correcting said target running force output value with said running force output correction amount;
   a display unit which displays a running force output state of said running force output device; wherein
   said running force output correction amount includes at least a disturbance-based correction amount which is calculated on the basis of at least a disturbance on said vehicle;
   said display unit displays a running force output state on the basis of a target running force output value for display in which the influence of said disturbance-based correction amount is reduced as compared with said post-correction target running force output value; and said target running force output value for display is a value which is derived by correcting said target running force output value with said running force output correction amount when said target running force output is larger in magnitude than a reference value, and is a value in which the influence of said disturbance-based correction amount is reduced as compared with said post-correction target running force output value when said target running force output is not larger in magnitude than said reference value.

2. A vehicle control device according to claim 1, wherein the value in which the influence of said disturbance-based correction amount is reduced as compared with said post-correction target running force output value is a value in which the influence of said disturbance-based correction amount is reduced to zero by correcting said target running force output value with a correction amount not involving said disturbance-based correction amount.

3. A vehicle control device according to claim 1, wherein the value in which the influence of said disturbance-based correction amount is reduced as compared with said post-correction target running force output value is a value which is derived by correcting said target running force output value with said running force output correction amount modified so as to reduce said disturbance-based correction amount in magnitude.

4. A vehicle control device according to claim 1, wherein the value in which the influence of said disturbance-based correction amount is reduced as compared with said post-correction target running force output value is a value which is derived by filtering said post-correction target running force output value with a particular pass-band frequency range including at least a vehicle resonant frequency range to determine a modification amount and subtracting the modification amount from said post-correction target running force output value.

5. A vehicle control device according to claim 1, wherein the value in which the influence of said disturbance-based correction amount is reduced as compared with said post-correction target running force output value is a value which is derived by sampling said post-correction target running force output value at a sampling interval other than intervals corresponding to a vehicle resonant frequency range.

6. A vehicle control device according to claim 1, wherein said disturbance-based correction amount is calculated as a feed-back control amount on the basis of a disturbance on the vehicle, and said running force output correction amount includes said disturbance-based correction amount and a feed-forward control amount calculated on the basis of the amount of driving operation by the driver.

7. A vehicle control device according to claim 1, wherein said target running force output value is a target vehicle driving force; with the vehicle driving direction being deemed to be a positive direction, said disturbance-based correction amount varies repeatedly in a plus and minus; and said display unit alters the indication of the running force output state in accordance with the sign of said target running force output value for display.

8. A vehicle control device according to claim 7, wherein said running force output device has an electric motor generator and an electric storage device, and when said post-correction target running force output value is a positive value, said electric motor generator generates driving force for driving vehicle wheels by means of an electric energy supplied from said electric storage device, while on the other hand, when said post-correction target running force output value is a negative value, said electric motor generator generates electricity by means of driving forces supplied from the vehicle wheels and charges said electric storage device.

9. A vehicle control device according to claim 8, wherein said display unit displays the indication as to whether said electric motor generator is generating driving force or electricity in accordance with the sign of said disturbance-based correction amount in a specific situation where said disturbance-based correction amount and said target running force output value for display are different from each other in sign and said disturbance-based correction amount is larger in magnitude than said target running force output value for display, while on the other hand, said display unit displays the indication as to whether said electric motor generator is generating driving force or electricity in accordance with the sign of said target running force output value for display in situations other than said specific situation.

10. A vehicle control device according to claim 8, wherein said display unit displays the indication as to whether said electric motor generator is generating driving force or electricity in accordance with whether or not said target running force output value for display is larger in magnitude than a state-decision reference value which is derived by subtracting said disturbance-based correction amount from said target running force output value for display in a specific situation where said disturbance-based correction amount and said target running force output value for display are different from each other in sign and said disturbance-based correction amount is larger in magnitude than said target running force output value for display, while on the other hand, said display unit displays the indication as to whether said electric motor generator is generating driving force or electricity in accordance with the sign of said target running force output value for display in situations other than said specific situation.

11. A vehicle control device comprising:
a target running force output value calculation unit which calculates a target running force output value for a vehicle on the basis of the amount of driving operation by a driver;
a running force output correction amount calculation unit which calculates a target running force output correction amount for suppressing vibration of the vehicle;
a control unit which controls a running force output device of the vehicle on the basis of a post-correction target running force output value which is derived by correcting said target running force output value with said running force output correction amount;
a display unit which displays a running force output state of said running force output device; wherein
said running force output correction amount includes at least a disturbance-based correction amount which is calculated on the basis of at least a disturbance on said vehicle;
when said target running force output is not larger in magnitude than a reference value, said control unit calculates said post-correction target running force output value so that the influence of said disturbance-based correction amount is reduced; and
said display unit displays a running force output state on the basis of said post-correction target running force output value.

12. A vehicle control device according to claim 11, wherein when said target running force output value is not larger in magnitude than said reference value, said control unit calculates said post-correction target running force output value by correcting said target running force output value with a correction amount not involving said disturbance-based correction amount.

13. A vehicle control device according to claim 11, wherein when said target running force output value is not larger in magnitude than said reference value, said control unit calculates said post-correction target running force output value by correcting said target running force output value with said running force output correction amount which is modified so as to reduce said disturbance-based correction amount in magnitude.

14. A vehicle control device according to claim 11, wherein when said target running force output value is not larger in magnitude than said reference value, with a value derived by correcting said target running force output value with said running force output correction amount being referred to a provisional post-correction target running force output value and a value derived by filtering said provisional post-correction target running force output value with a particular passband frequency range including at least a vehicle resonant frequency range being referred to a modification amount, said control unit calculates said post-correction target running force output value by subtracting said modification amount from said provisional post-correction target running force output value.

15. A vehicle control device according to claim 11, wherein when said target running force output value is not larger in magnitude than said reference value, with a value derived by correcting said target running force output value with said running force output correction amount being referred to a provisional post-correction target running force output value, said control unit calculates said post-correction target running force output value by sampling said provisional post-correction target running force output value at a sampling interval other than intervals corresponding to a vehicle resonant frequency range.

16. A vehicle control device according to claim 11, wherein said control unit calculates as said post-correction target running force output value a value which includes said disturbance-based correction amount calculated as a feed-back control value on the basis of a disturbance on the vehicle and a feed-forward control amount calculated on the basis of the amount of driving operation by the driver.

17. A vehicle control device according to claim 11, wherein said target running force output value is a target vehicle driving force; with the vehicle driving direction being deemed to be a positive direction, said disturbance-based correction amount varies repeatedly in a plus and minus; and said display unit alters the indication of the running force output state in accordance with the sign of said post-correction target running force output value.

18. A vehicle control device according to claim 17, wherein said running force output device has an electric motor generator and an electric storage device, and when said post-correction target running force output value is a positive value, said electric motor generator generates driving force for driving vehicle wheels by means of an electric energy supplied from said electric storage device, while on the other hand, when said post-correction target running force output value is a negative value, said electric motor generator generates electricity by means of driving forces supplied from the vehicle wheels and charges said electric storage device.

* * * * *